US011992466B2

(12) United States Patent
Ozolins et al.

(10) Patent No.: US 11,992,466 B2
(45) Date of Patent: May 28, 2024

(54) SMART CAP

(71) Applicant: Digital Medical Technologies, LLC, New York, NY (US)

(72) Inventors: Helmars E. Ozolins, Orient, NY (US); Christopher Ryan Waldenburg, New York, NY (US); Eric Nelson, Minneapolis, MN (US); Peter D. Scott, Romulus, NY (US)

(73) Assignee: Digital Medical Technologies, LLC, New York, NY (US)

( * ) Notice: Subject to any disclaimer, the term of this patent is extended or adjusted under 35 U.S.C. 154(b) by 201 days.

(21) Appl. No.: 17/530,825

(22) Filed: Nov. 19, 2021

(65) Prior Publication Data

US 2022/0160586 A1 May 26, 2022

Related U.S. Application Data

(60) Provisional application No. 63/116,247, filed on Nov. 20, 2020.

(51) Int. Cl.
*A61J 7/04* (2006.01)
*A61J 1/03* (2023.01)
*G08B 7/06* (2006.01)

(52) U.S. Cl.
CPC ............... *A61J 7/0481* (2013.01); *A61J 1/03* (2013.01); *G08B 7/06* (2013.01); *A61J 2200/30* (2013.01); *A61J 2200/72* (2013.01); *A61J 2200/74* (2013.01); *A61J 2205/60* (2013.01); *A61J 2205/70* (2013.01)

(58) Field of Classification Search
CPC ........ A61J 7/0481; A61J 1/03; A61J 2200/30; A61J 2200/72; A61J 2200/74; A61J 2205/60; A61J 2205/70; A61J 2200/70; A61J 1/1412; G08B 7/06
See application file for complete search history.

(56) References Cited

U.S. PATENT DOCUMENTS

2014/0239062 A1* 8/2014 Nurse ................ G06K 19/0723 235/487
2015/0360834 A1* 12/2015 Mikhail ............... B65D 51/248 340/384.5
2018/0046833 A1* 2/2018 Havas .................... G06Q 10/10
2018/0240540 A1* 8/2018 O'Keefe ............... A61J 1/1412

OTHER PUBLICATIONS

International Search Report and Written Opinion dated Mar. 11, 2022 of International Patent Application No. PCT/US2021/060094, filed Nov. 19, 2021.

* cited by examiner

*Primary Examiner* — Omeed Alizada
(74) *Attorney, Agent, or Firm* — Mintz, Levin, Cohn, Ferris, Glovsky and Popeo, P.C.

(57) ABSTRACT

A smart medication container cap for medication management and related devices, systems and methods for medication management are provided. The smart cap ensures ensuring accuracy in dispensing, prompts the user promoting compliance, collects information about the medication, transmits the information to a central server or LAN, determining container contents, locations, and surroundings, remotely manages the same, transmits alerts to the user, and communicates with a computer system for the same.

21 Claims, 27 Drawing Sheets

SMART CAP

CROSS-REFERENCE TO RELATED APPLICATIONS

The present application claims priority to U.S. Provisional Patent Appl. No. 63/116,247 to Ozolins et al., filed Nov. 20, 2020, and entitled "Smart Cap Medication Management Device, System, Method And Computer-Implemented Control Of Same; An Architecture; And A Local Pico Network For Near Field Communications For Same", and incorporates its disclosure herein by reference in its entirety.

TECHNICAL FIELD

The present disclosure relates to dispensing of medication, and in particular, to a smart cap for use with a medication container, and more particularly, to smart caps and related devices, systems and methods for medication management, ensuring accuracy, determining container contents, locations, and surroundings, remotely managing the same, a computer system for the same, and the like.

BACKGROUND

Medications are often prescribed to alleviate and/or treat various medical conditions, illnesses, etc. A lot of times, medications are not timely and/or properly consumed and/or refilled by individuals for whom they were prescribed. Some of the reasons for that include forgetfulness, lack of clear instructions for medication, prescription refills, etc., lack of adequate monitoring by health care provider(s), pharmacies, etc., lack of communication with the individuals, etc. Medications are typically packaged in several different types of containers and include a cover to protect the contents of the container. Conventional medication containers and associated covers do not have communication capabilities to enable communications with local or remote computing networks that can use the communicated data to generate reminders and/or alerts, manage prescriptions, refill processes, etc. Moreover, developed medication management devices and methods were not configured for communication via near field communication and/or cellular technology in a relatively low cost cap that fits on an existing cap or easily replaces a conventional cap. Further, traditional medication containers and associated covers are wasted after every use.

SUMMARY

In some implementations, the current subject matter relates to a smart cap that can include one or more of a top cap, one or more board snaps, a board, one or more cap slides, a bottom cap, one or more snap slots, one or more return springs, and one or more spring slots.

In some implementations, the current subject matter can be configured to include one or more of the following optional features. The smart cap can be configured to engage a cap of a standard pill bottle cap. The smart cap can be configured to replace a standard cap for a standard bottle. The smart cap can further include a switch and a switch toggle feature. The smart cap can include an OLED display. The smart cap can further include a top label. The smart cap can further include a USB connector. The smart cap can further include speaker slots, and a speaker. The smart cap can further include one or more light emitting diodes (LEDs). The smart cap can further include a processor capable of near-field communication (NFC). The smart cap can further include a radio-frequency identifying (RFID) label configured for near-field communication.

In some implementations, the current subject matter relates to a method for managing medication. The method can be implemented using a smart cap that can include a top cap, a board, and a bottom cap. The method can be computer-implemented, such as, for example, a computing device can be provided. The computing device can include at least one processor and a memory storing at least one program for execution by the processor. The program can include one or more instructions, which, when executed by the processor can cause the processor to perform one or more operations. The operations can include displaying medication messages on a display of the smart cap in response to one or more sensor readings obtained from the smart cap, and exciting an audio and/or vibration source (e.g., an audio system, a haptic-style vibrator of the smart cap, etc.) in response to the sensor readings obtained from the smart cap In some implementations, the current subject matter can include one or more of the following optional features. For example, the operations can include communicating via a Bluetooth low energy (BLE) radio or in any other way, and/or establishing an ad-hoc wireless networks between one or more smart caps and an external device, and/or establishing a pico-network (PicoNet) or any other type of network between one or more smart caps and an external device. The operations can include establishing the ad-hoc wireless network and/or PicoNet with a secondary smart cap without a modem and with a BLE radio. The operations can include consolidating all of a patient's smart-enabled medication under one account and data stream. The operations can include integration of the smart cap with a smartphone application.

In some implementations, the current subject matter relates to a system for managing medication. The system can be implemented using a smart cap that can include a top cap, a board, and a bottom cap. The system can include a device having at least one processor and a memory storing at least one program for execution by the processor. The program can include instructions, when, executed by the processor can cause the processor to perform one or more operations. The operations can include displaying medication messages on a display of the smart cap in response to sensor readings obtained from the smart cap, and exciting an audio and/or vibration source (e.g., an audio system, a haptic-style vibrator, etc.) of the smart cap in response to sensor readings obtained from the smart cap.

In some implementations, the current subject matter can include one or more of the following optional features. In particular, the operations can include communicating via a BLE radio. The operations can include establishing ad-hoc wireless networks between one or more smart caps and an external device. The operations can include establishing PicoNETs between one or more smart caps and an external device. The operations can include establishing the ad-hoc wireless network and/or PicoNet with a secondary smart cap without a modem and with a BLE radio. The operations can include consolidating all of a patient's smart-enabled medication under one account and data stream. The operations can include integration of the smart cap with a smartphone application.

In some implementations, the current subject matter relates to a non-transitory computer-readable storage medium storing at least one program for medication management. The program can be implemented for use with a smart cap that can include a top cap, a board, and a bottom cap. The program can be executed by at least one processor and a memory storing the program. The program can include instructions, when, executed by the processor cause the processor to perform one or more operations. The operations can include displaying medication messages on a display of the smart cap in response to sensor readings obtained from the smart cap, and/or exciting an audio and/or vibration source (e.g., an audio system, a haptic-style vibrator, etc.) of the smart cap in response to sensor readings obtained from the smart cap.

In some implementations, the current subject matter can include one or more of the following optional features. In particular, the operations can include one or more of the following: communicating via a BLE radio or in any other way, establishing ad-hoc wireless networks between one or more smart caps and an external device, establishing PicoNETs between one or more smart caps and an external device, establishing the ad-hoc wireless network and/or PicoNet with a secondary smart cap without a modem and/or with a BLE radio, consolidating all of a patient's smart-enabled medication under one account and data stream, and/or integration of the smart cap with a smartphone application.

Moreover, any other non-transitory computer program products (i.e., physically embodied computer program products) are also described that store instructions, which when executed by one or more data processors of one or more computing systems, causes at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

It is noted that the drawings are not necessarily to scale. The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting exemplary implementations and that the scope of the present invention is defined solely by the claims.

DETAILED DESCRIPTION

In some implementations, the current subject matter relates to a cellular connected medication reminder device in a medication adherence space. In particular, the current subject matter relates to a cap for a medication container having one or more processing capabilities (also referred to as a "smart cap" herein). The smart cap can be configured to fit and/or cover a cap of a standard medication container (e.g., a pill bottle cap), and/or can be used as a new cap for a medication container. The smart cap can be configured to provide various data capabilities and/or be operable with various smart pill bottle systems. The smart cap can include one or more size(s) that can be customizable to fit over one or more existing caps and/or configured to replace existing caps of medication containers.

Figure 1:
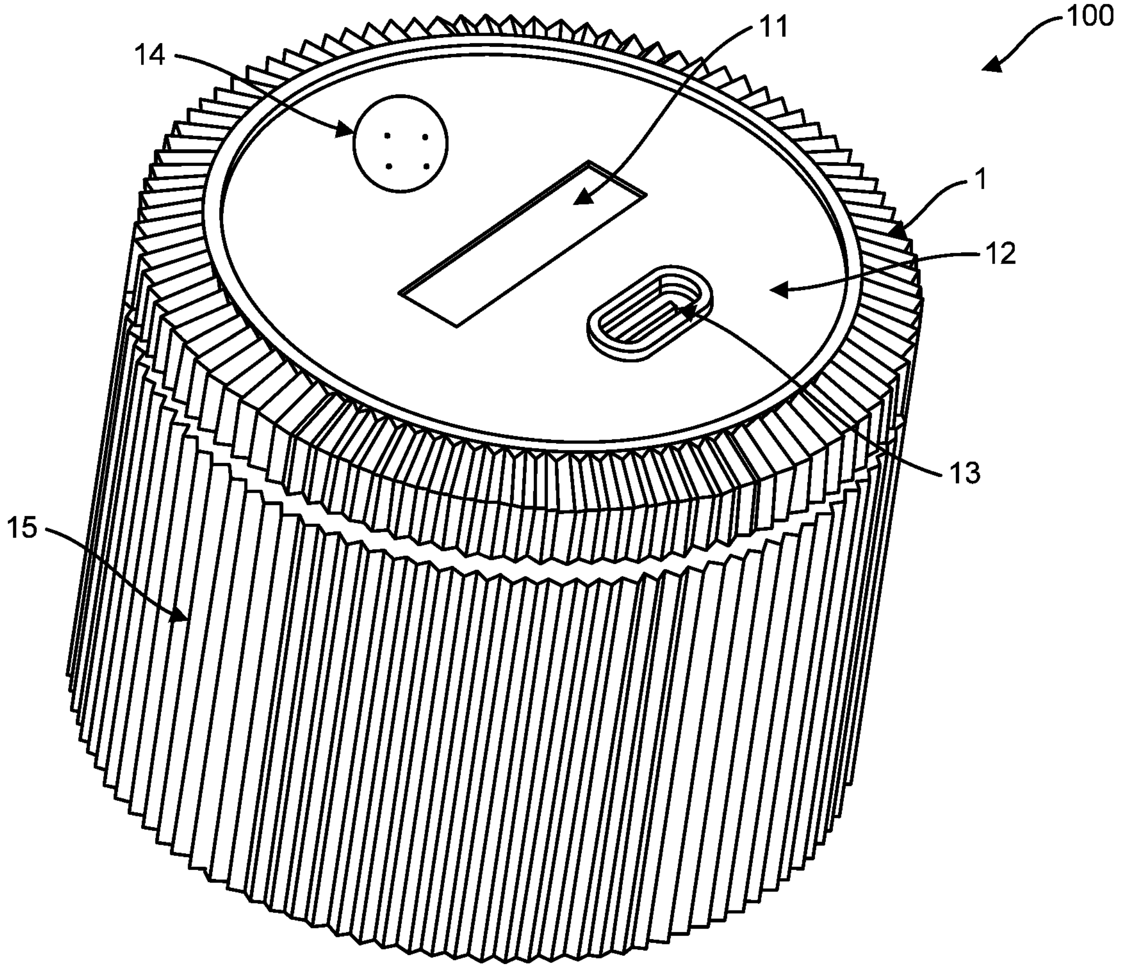
FIG. 1 illustrates a solid isometric view of an exemplary smart cap, according to some implementations of the current subject matter.
Figure 2:
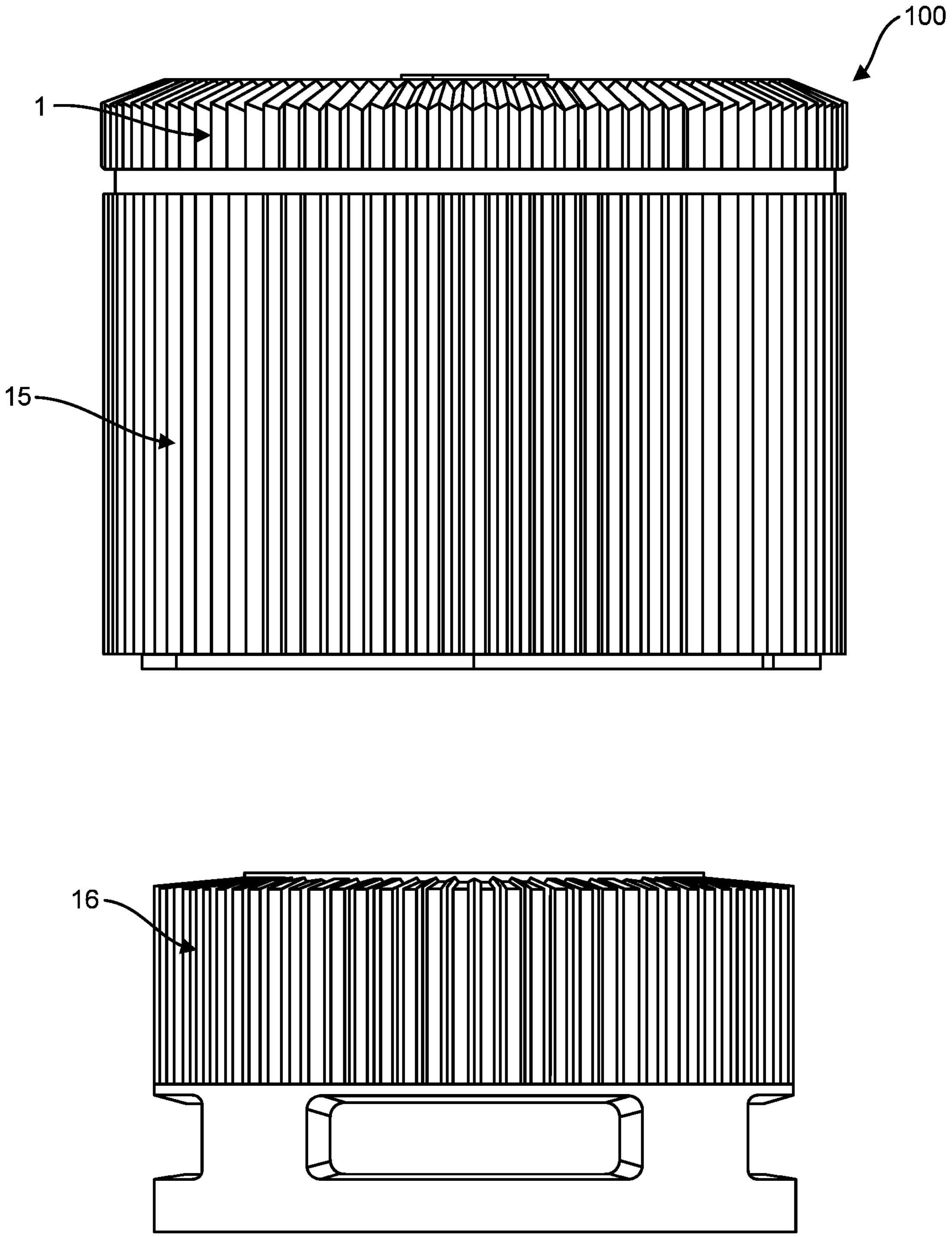
FIG. 2 illustrates an exploded view of the exemplary smart cap, according to some implementations of the current subject matter.
Figure 3:
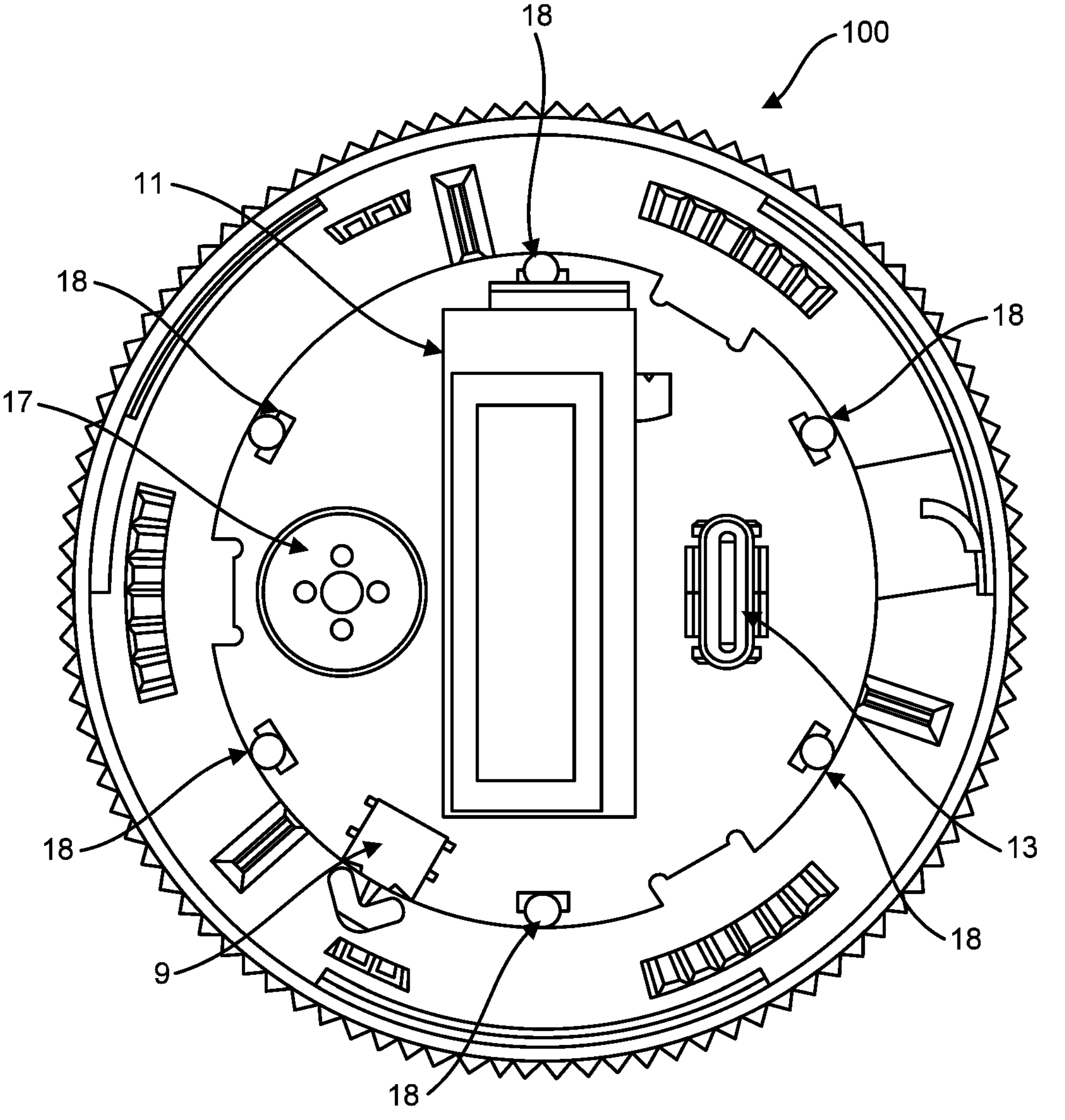
FIG. 3 illustrates a cutaway top down view of the exemplary smart cap with a top label and a top cap removed, according to some implementations of the current subject matter.
Figure 4:
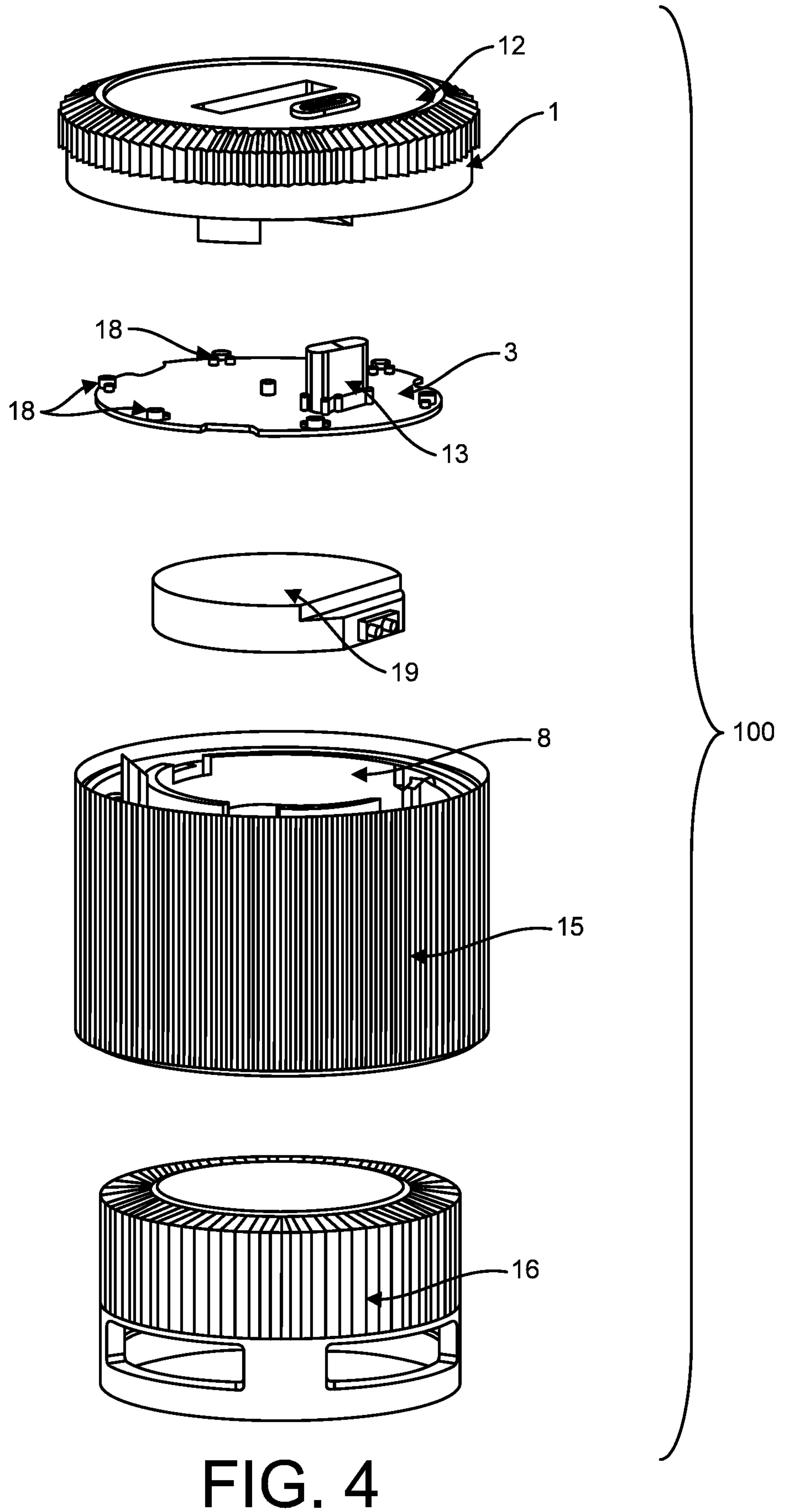
FIG. 4 illustrates an exploded view of various components of the exemplary smart cap, according to some implementations of the current subject matter.
Figure 7:
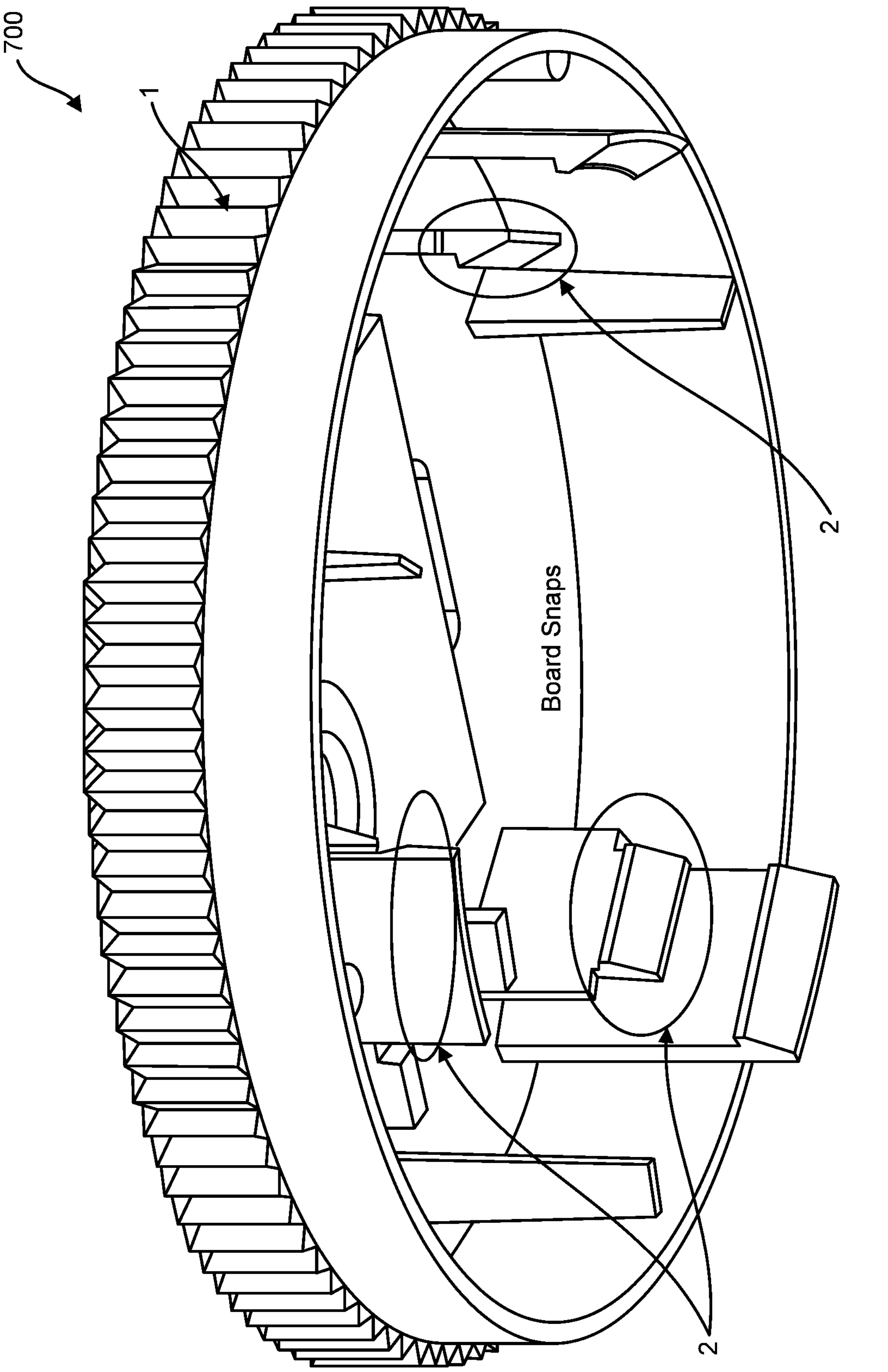
FIG. 7 illustrates a perspective view of an exemplary top cap of the smart cap, whereby the top cap having one or more board snaps, according to some implementations of the current subject matter.
Figure 18:
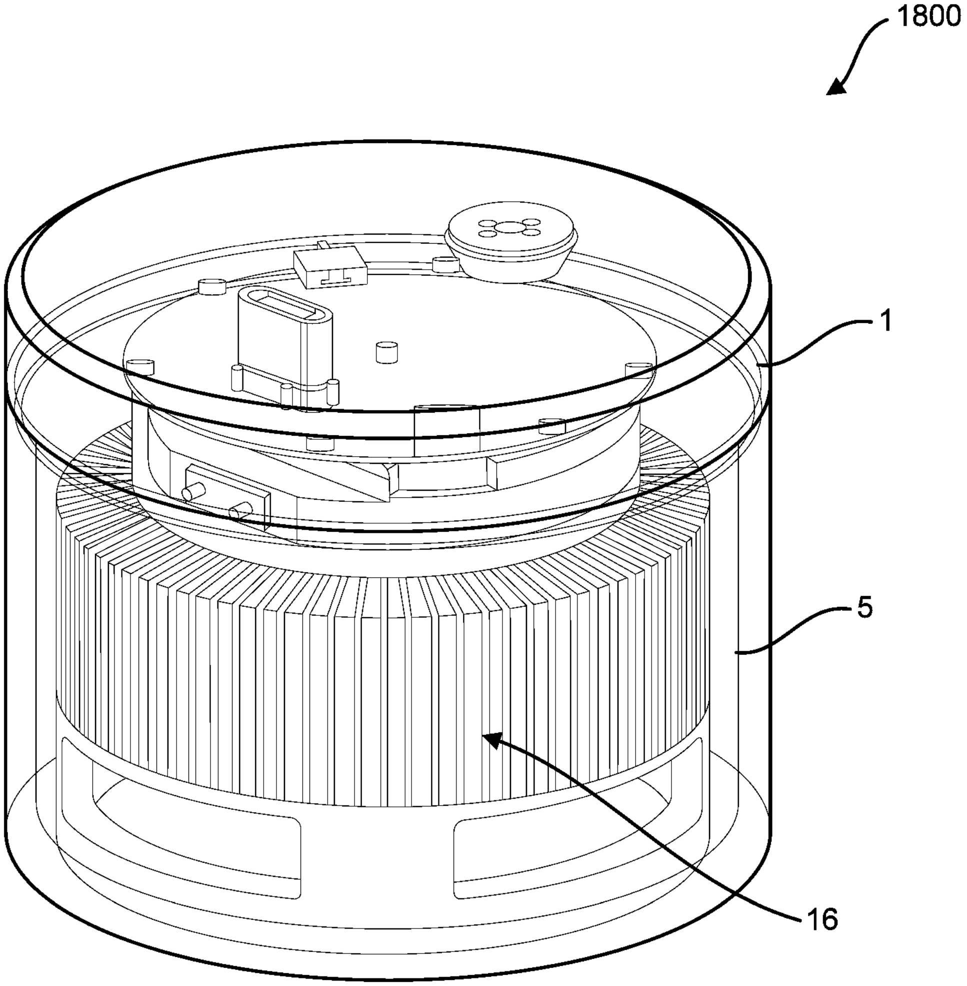
FIG. 18 illustrates a transparent isometric view of an exemplary full smart cap over and encompassing an existing cap therein, according to some implementations of the current subject matter.

FIGS. 1-4 illustrate an exemplary smart cap 100, according to some implementations of the current subject matter. In particular, FIG. 1 is a solid isometric view of the exemplary smart cap 100, according to some implementations of the current subject matter. FIG. 2 is an exploded view of the smart cap 100 and an existing cap 16, according to some implementations of the current subject matter. FIG. 3 is a cutaway top down view of the smart cap 100 with a top label 12 and the top cap portion 1 removed, according to some implementations of the current subject matter. FIG. 4 is an exploded view of major components of the smart cap 100, according to some implementations of the current subject matter. One or more features of smart cap 100 can be similar to those described below with reference to the smart cap 700 and/or 1800 without limitation, as shown in FIGS. 7 and 18 et seq., respectively.

The smart cap 100 can be configured to include one or more of the following: a top cap portion 1, one or more board snaps 2, one or more electronic boards (e.g., a printed circuit board (PCB)) 3, one or more cap slides 4, a bottom cap portion 15, one or more snap slots 6, one or more return springs 7, one or more spring slots 8, one or more switches 9, one or more switch toggle feature(s) 10, one or more display(s) (e.g., an organic light-emitting diode (OLED), liquid crystal display (LCD), etc.) 11, one or more top label(s) 12, one or more connector(s) (e.g., universal serial bus (USB)) 13, one or more speaker slot(s) 14, one or more skirt(s) 15, one or more speaker(s) 17, one or more red-green-blue (RGB) LED(s) 18, one or more batter(ies) 19.

FIG. 1 illustrates the top cap portion 1, the display 11, the top label 12, the connector (e.g., USB-C as shown in FIG. 1) 13, the speaker slots 14, and the skirt 15 are shown in FIG. 1. In some implementations, the top cap portion can be configured to embed one or more of the display 11, the top label 12, the connector 13, the speaker 14, and/or any other components. Alternatively, or in addition to, the components 11-14 can be integrated with the top cap portion 1. The speaker slots 14 can include one or more perforations in the top cap portion 1 and/or the top label 12. The display 11 can be a rectangular shaped (and/or any other shape, e.g., oval, circular, triangular, irregular, etc.) module that can be positioned on the surface of the top cap portion 1 and/or the top label 12. The connector 13 can have an outlet positioned on the surface of the top cap portion 1 and/or the top label 12. The skirt 15 can be patterned, as shown in FIGS. 1-2, to allow for betting gripping of the smart cap 1 when opening and/or closing of the medication container (not shown in FIGS. 1-2).

Figure 5:
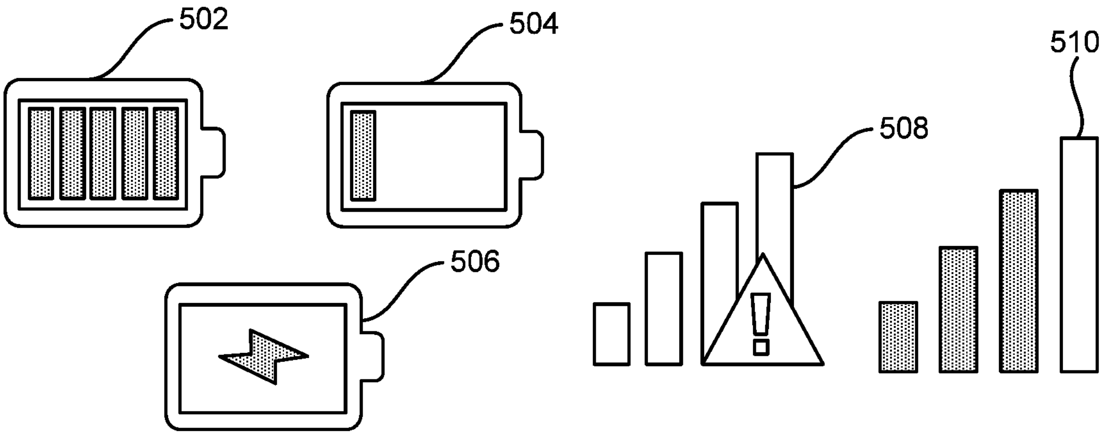
FIG. 5 illustrates exemplary icons for display on a visual display screen, according to some implementations of the current subject matter.

The display 11 can be configured to display one or more messages and/or alerts to a user of the smart cap 100 and/or the associated medication container, e.g., "refill due", "10 pills left", "take medication now", etc. Further, display 11 can be configured to display various icons indicative of battery power levels, connection signal levels, etc. FIG. 5 illustrates exemplary display icons 502-510 that can be shown by the display 11. By way of a non-limiting example, the display 11 can show "Display Battery Status" (e.g., a battery icon (e.g., an outline of a battery) with five bars indicating a full battery, as shown by icon 502), "Battery Low" (e.g., the battery icon 504 with only one of the five bars being displayed indicating a partially charged battery), "Charging" (e.g., the battery icon 506 with a lightning bolt therein), as well as any other power-related icons. Further, the display 11 can show communication icons, such as "NO Cell" (e.g., an icon 508 with four side-by-side bars of different lengths with an explanation point in a triangle over the bars), "Cell OK" (e.g., an icon 510 with four side-by-side bars of different lengths with three of the four bars illuminated indicating a strong cell signal), as well as any other icons.

The speaker 14 can be configured to generate/produce one or more messages and/or alerts to the user, e.g., prompting the user to take medication, obtain refill, etc. The speaker 14 can be used together with the display 11 to alert the user to specific actions that may be required of the user (e.g., charge the battery of the smart cap 100 by plugging in a charging cable and connecting to an external power source).

The connector 13 can be used for transferring data between the smart cap 100 and/or an external processor, server, computer, etc. (not shown in FIGS. 1-4). The connector 13 may also be used for charging purposes, such as, for example, a power cable (not shown in FIGS. 1-4) can be plugged into the connector 13 and an external power source (not shown in FIGS. 1-4) for transfer of power to the battery 19.

For example, one or more of the components of the smart cap 100 and/or the smart cap 100 can be communicatively coupled, such as using the connector 13 and/or a wireless communication transceiver embedded into the smart cap 100, with one or more such external processors, servers, computers, etc. using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof. Moreover, the elements of the smart cap 100 can include any combination of hardware and/or software. In some implementations, the elements can be disposed on a single computing device and/or can be part of a single communications network. Alternatively, the elements can be separately located from one another.

Referring to FIG. 2, an existing cap 16 (e.g., from a conventional medication container, such as a pill bottle) can be configured to be positioned and/or to fit within an interior portion of the smart cap 100 assembly. For example, the existing cap 16 can be configured to be inserted into an interior portion of the smart cap 100 with the skirt portion 15 (either temporarily and/or permanently coupled to the top cap portion 1, as shown in FIG. 2) enclosing the existing cap 16. One or more retaining devices, as discussed below, can be configured to retain the existing cap 16. Alternatively, or in addition to, the smart 100 can be used with any medication container without the use of the existing cap 16. FIGS. 18-19 and 21-22 illustrate one or more additional and/or alternate implementations of the smart cap 100 in that regard.

Referring to FIG. 3, an interior cut-away view of the smart cap 100 with top label and/or top cap portion 1 being removed is shown. In particular, The interior of the smart cap 100 can include the switch 9, the display 11, the connector 13, the speaker 17, and the plurality of RGB LEDs 18 are shown. As stated above, FIG. 4 illustrates an exploded view of the smart cap 100 as well as the existing cap 16 that can be configured to be positioned inside the smart cap 100. As shown in FIG. 4, the smart cap 100 can include the skirt 15, the spring slots 8, the battery 19, the board (e.g., PCB) 3, the connector 13 positioned on the board 3, the LEDs 18, and the top cap portion 1 with the top label 12 positioned on a top of the top cap portion 1.

Figure 6:
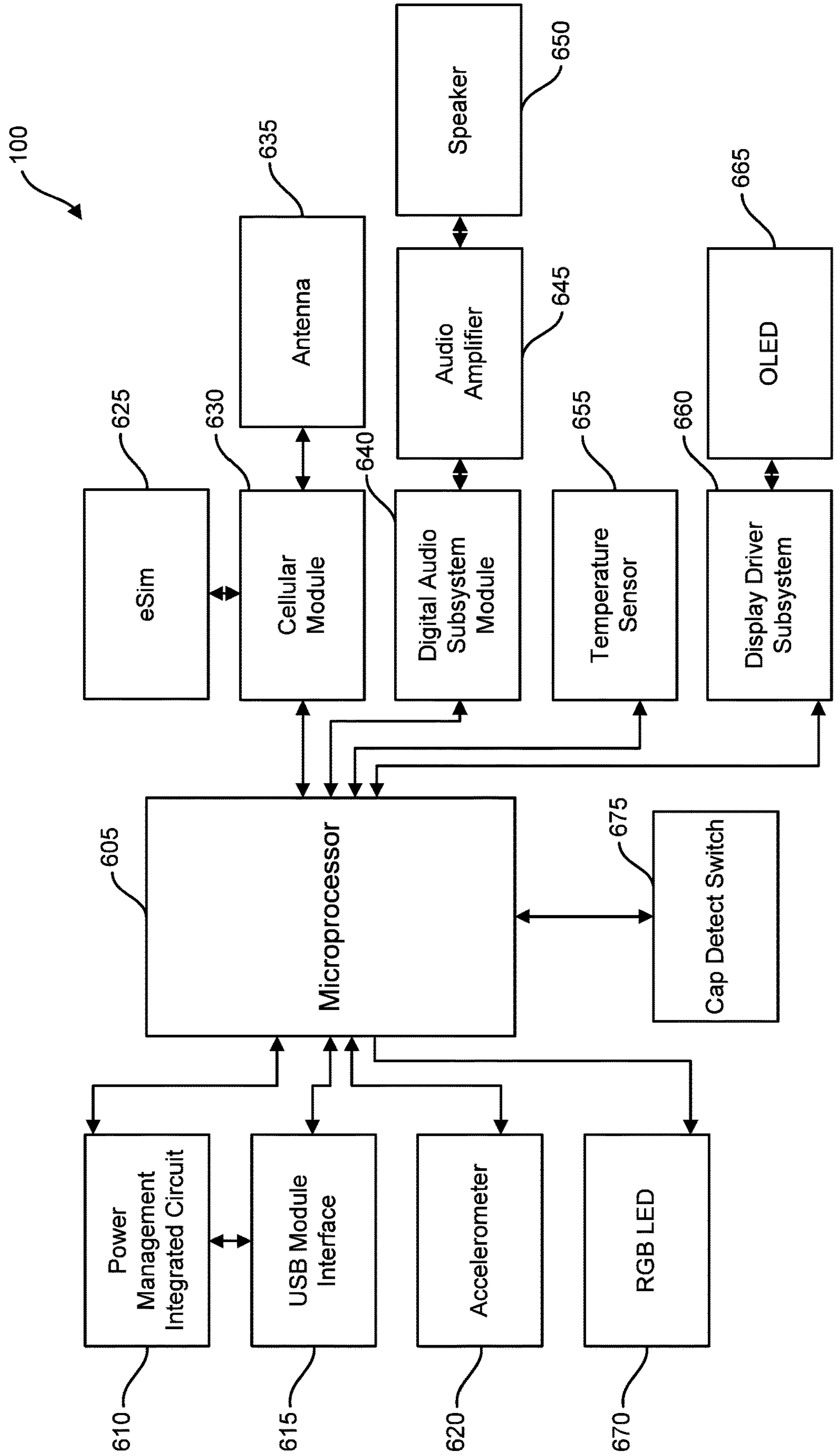
FIG. 6 illustrates a diagram of an exemplary architecture, according to some implementations of the current subject matter.

FIG. 6 illustrates an exemplary processing architecture 600 of the smart cap 100, according to some implementations of the current subject matter. One or more computing components of the architecture 600 can be positioned/incorporated onto the board 3 and/or be communicatively coupled to one or more components positioned/incorporated onto the board 3. The architecture 600 can include a microprocessor 605 operatively coupled with one or more of a power management integrated circuit (PMIC) 610, a connector (e.g., USB) module interface 615, an accelerometer 620, an eSIM 625, a cellular module 630, a digital audio subsystem module 640, a temperature sensor 655, a display driver subsystem 660, and the like. The digital audio subsystem module 640 can be operatively coupled to an audio amplifier 645, which can be operatively connected to a speaker 650. The cellular module 630 can be operatively connected to an antenna 635. The display driver system 660 can be operatively connected to a display (e.g., OLED, LCD, etc.) 665. A cap detect switch 675 can be operatively connected to transmit information to the microcontroller 605. The microprocessor 605 can be operatively connected to RGB LEDs 670. There can be, for example, a plurality of LEDs (e.g., LEDs 6).

The power management integrated circuit 610 can be configured to be operatively coupled to the connector module interface 615 (e.g., connector 13). Using the circuit 610 and the interface 615, the microprocessor 605 can be configured to receive and/or control power supply to the smart cap 100, including but not limited, to one or more elements of the architecture 600. For example, upon detecting low power supply, using the circuit 610, the microprocessor 605 can cause the display driver subsystem 660 to display an appropriate icon (shown in FIG. 5) using display 665. The interface 615 can then be used to receive power from an external power source (e.g., via a power cable) and charge the battery 9 using the circuit 610. In some implementations, based on the data that the microprocessor 605 receives from the circuit 610, the microprocessor 605 may cause one or more of the LEDs 670, and/or the audio components (e.g., module 640, audio amplifier 645, and/or speaker 650) and/or the display components (e.g., subsystem 660 and/or display 665) to generate various alert signals, messages, indicators, icons, etc.

The accelerometer 620 can be configured to obtain measurements concerning smart cap 100 usage (e.g., opening, closing, number of medication left, etc.), variety of smart cap 100 movements, location of the smart cap 100, etc. and/or any combination thereof. The microprocessor 605 can be configured to receive various data from the accelerometer 620 and/or any other measurements concerning usage of the smart cap 100 by the user(s), including time measurements, accelerometer measurements, etc. and compute data concerning the usage. For example, the microprocessor 605 can be configured to determine an amount of medications (e.g., pills, liquid volume, level, etc.) remaining in the medication container, a length of time between the user's prior smart cap 100's usage (e.g., opening and closing of a medication container) and the present use time, a length of time of between medication refills, measurements concerning user's behavior related to medication usage patterns, management, etc. Further, using the data that the microprocessor 605 receives from the accelerometer 620, the microprocessor 605 can cause one or more of the LEDs 670, and/or the audio components (e.g., module 640, audio amplifier 645, and/or speaker 650) and/or the display components (e.g., subsystem 660 and/or display 665) to generate various alert signals, messages, indicators, icons, etc.

The cap detect switch 675 can be communicatively/operatively coupled to the microprocessor 605 to detect whether the smart cap 100 has been positioned on and/or removed from the existing cap 16, the medication container (not shown in FIG. 6), and/or used in any other way. The cap detect switch 675 can include a torsional switch to indicate whether the smart cap is being opened and/or closed. Alternatively, or in addition to, the cap detect switch 675 can include a magnetometer and/or magnetic patch on the bottle to indicate whether the smart cap is present and/or has been/being removed from the mediation container and/or the existing cap 16 (not shown in FIG. 6) of the medication container, etc. Based on the data that the microprocessor 605 receives from the switch 675, the microprocessor 605 may cause one or more of the LEDs 670, and/or the audio components (e.g., module 640, audio amplifier 645, and/or speaker 650) and/or the display components (e.g., subsystem 660 and/or display 665) to generate various alert signals, messages, indicators, icons, etc.

The communication components (e.g., cellular module 630, antenna 635, and/or eSim (e.g., sim card) module 625) of the architecture 600 can be configured to provide communication capabilities to the smart cap 100. The communication components can be used to receive and/or transmit various signals related to usage of the smart cap 100, measurements of medication remaining inside the medication container, refill instructions/indications, prescription reminders, etc. The signals can be exchanged with one or more external computers, processors, servers, etc. (such as those that may be located at a pharmacy, at hospital(s), at doctor's office(s), an insurance company office(s), at medical clinic(s), etc.). The signals can be transmitted wirelessly (e.g., using cellular networks, Wi-Fi, Bluetooth™ and related communication protocols, near field communications, etc.), via a wired connection, and/or both. Using the data that the microprocessor 605 receives from the communication components (e.g., cellular module 630, antenna 635, and/or eSim (e.g., sim card) module 625), the microprocessor 605 may cause one or more of the LEDs 670, and/or the audio components (e.g., module 640, audio amplifier 645, and/or speaker 650) and/or the display components (e.g., subsystem 660 and/or display 665) to generate various alert signals, messages, indicators, icons, etc.

In some implementations, the smart cap 100 can include a digital audio record/playback system (e.g., the digital audio subsystem module 640), a piezoelectric device, and/or any other audio device. The digital audio subsystem can store and/or generate simple and/or complex audio sounds and/or audio/voice alerts and/or prompts, including, but not limited to at least one of the following. The digital audio record/playback system can be configured to generate/play a message, such as, for instance, "Time for Medication", "Medication low—Please refill", "Caution: Dose was already taken today at xx:xx o'clock", pleasant/unpleasant monophonic/polyphonic sound(s), sound(s) increasing in volume as dose time approaches and/or has passed, sound(s) that may variate in intensity, frequency, pitch, etc. depending on a type of alerts being generated (e.g., "dosage missed, please take your dosage immediately", etc.), differing sounds depending on types of alerts, and/or any other sounds.

The digital audio record/playback system can be configured to receive as input voice input (commands) such as, for instance, "Refill", "Last Dose", "Next Dose", to receive as sound/sensor input a waveform approximating a "Pill Rattle" sound, etc. The system can be configured to receive as input additional confirmation of pills being dispensed.

In some implementations, the microprocessor 605 can be configured to cause measurement of medication volume (inside the medication container to which the smart cap is coupled) via, for example, a frequency shift from a kinaesthetic input pulse, cause estimation of pill volume based on sound frequency shift from an empty bottle, etc. Audio and/or vibratory output can be generated by causing the microprocessor 605 to have the digital audio record/playback system generate a sound and/or a haptic-style vibration.

The microprocessor 605 can also receive data from the temperature sensor 655 relating to operational temperature of the smart cap 100. This data can indicate whether there may be a malfunction in the operation of the architecture 600. Alternatively, or in addition to, the temperature sensor 655 can be configured to measure temperature of the medication contained within the medication container and determine whether the measured temperature is less than or greater than one or more predetermined temperature values associated with a particular medication stored inside the container. In some exemplary implementations, one or more threshold temperature values can be associated with upper and/or lower temperature limits associated with the medication. Upon receiving, temperature data from the sensor 655, the microprocessor 605 can cause one or more of the LEDs 670, and/or the audio components (e.g., module 640, audio amplifier 645, and/or speaker 650) and/or the display components (e.g., subsystem 660 and/or display 665) to generate various alert signals, messages, indicators, icons, etc.

The microprocessor 605 can include predetermined values relating to desired measurements or measurement ranges for the data concerning usage of the smart cap 100 by the user (e.g., number of medications remaining in the container, skipped dosages, etc.) and/or system operational data (collectively, the "usage data"). For example, the microprocessor 605 can include predetermined values representing a minimum or a maximum or a specific length of time between medication refills, a minimum or maximum or a specific length of time between times for taking medication, one or more reminders to take medication, make an appointment with a medical professional, etc. The specific values can be transmitted to the smart cap 100 and/or pre-programmed based on a specific user and/or medication and/or container. The microprocessor 605 can be configured to compare the measured usage data to the predetermined values and determine if the usage data is in compliance with such values.

In some implementations, as shown in FIG. 6 and discussed above, the smart cap 100 can include one or more of an accelerometer (e.g., the accelerometer 620) and/or a magnetometer. The accelerometer and/or the magnetometer can be configured to trigger at least one of the one or more of the following operations: wake the smart cap 100 from a sleep state when the smart cap 100 and/or the medication container to which the smart cap 100 is coupled are picked up, measure whether the medication container (with which the smart cap 100 is used) is being lifted and/or tilted, detect and/or measure motion (e.g., rotational, horizontal, vertical, etc.) of the smart cap 100, enter and execute a compass mode, and/or perform any other operations.

Using the smart cap's visual display system (e.g., display driver subsystem 660, display 665), the smart cap 100 can be configured to display various messages, alerts, etc. to the user. The visual display system can be a screen embedded into the top cap portion 1 (not shown in FIG. 6), and can be configured to implement various visual technology, e.g., but not limited to, OLED, e-ink, LCD, etc. which can display words and/or images to facilitate certain actions from the user. The visual display system can be configured to display one or more icons, such as those shown in FIG. 5, e.g., "Display Battery Status", "Battery Low", "Charging", "NO Cell", "Cell OK", etc. The visual display system can be configured to display alphanumeric and/or symbolic information corresponding to, for example, a clock to indicate a next dose time and/or a countdown to a dose. The visual display system can be configured to display various information relate to refills (e.g., "REFILL"), doctor's appointments, medical insurance information, etc.

FIGS. 7-17 illustrate another exemplary implementation of the smart cap 700, according to some implementations of the current subject matter. One or more features of the smart cap 700 can be similar to those described with reference to the smart cap 100 and/or 1800 shown in FIGS. 1 and 18 et seq., respectively, without limitation. Referring to FIGS. 7-17, the smart cap 700 can include one or more of the following features in any desired combination, the top cap portion 1, one or more board snaps 2, the board (e.g., PCB) 3, one or more cap slides 4, the bottom cap portion 15, one or more snap slots 6, one or more return springs 7, one or more spring slots 8, one or more switches 9, and one or more switch toggle features 10.

FIG. 7 is a perspective view of the top cap portion 1 of the smart cap 700, according to some implementations of the current subject matter. The top cap portion 1 can include one or more board snaps 2 prior to receiving the board (e.g., PCB) 3. The one or more board snaps 2 can be configured to retain the board 3 within the top cap portion 1. In some exemplary implementations, each of the board snaps 2 can have a wedge-shape end and/or any other shaped end. Each of the board snaps 2 can be configured for one-way irreversible and/or reversible connection. The board snaps 2 can be configured to retain the board 3 by way of friction fit, tension fit, lock-and-key fit, and/or in any other way.

Figure 8:
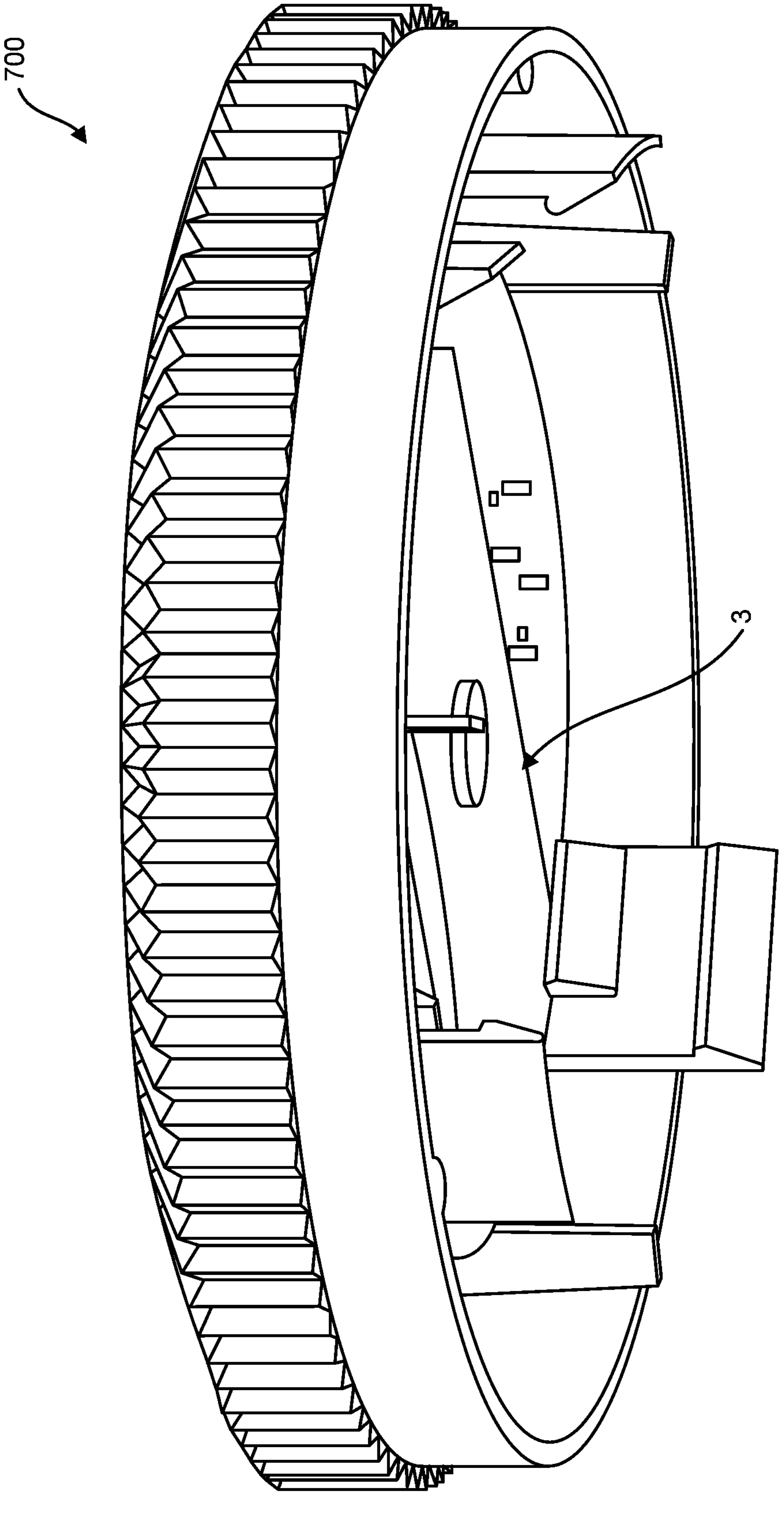
FIG. 8 illustrates a perspective view of the exemplary smart cap, whereby the top cap can be configured to receive a nested board, according to some implementations of the current subject matter.

FIG. 8 is a perspective view of the smart cap 700, which shows the top cap portion 1 retaining the board 3, where the board 3 can be configured to be nested inside the board 3 using the board snaps 2. As can be understood, any differences in dimensions and/or ratios between elements shown in FIGS. 7 and 8 are merely exemplary of the different form factors that can be implemented for various bottles or when replacing an existing cap with the smart cap 700.

Figure 9:
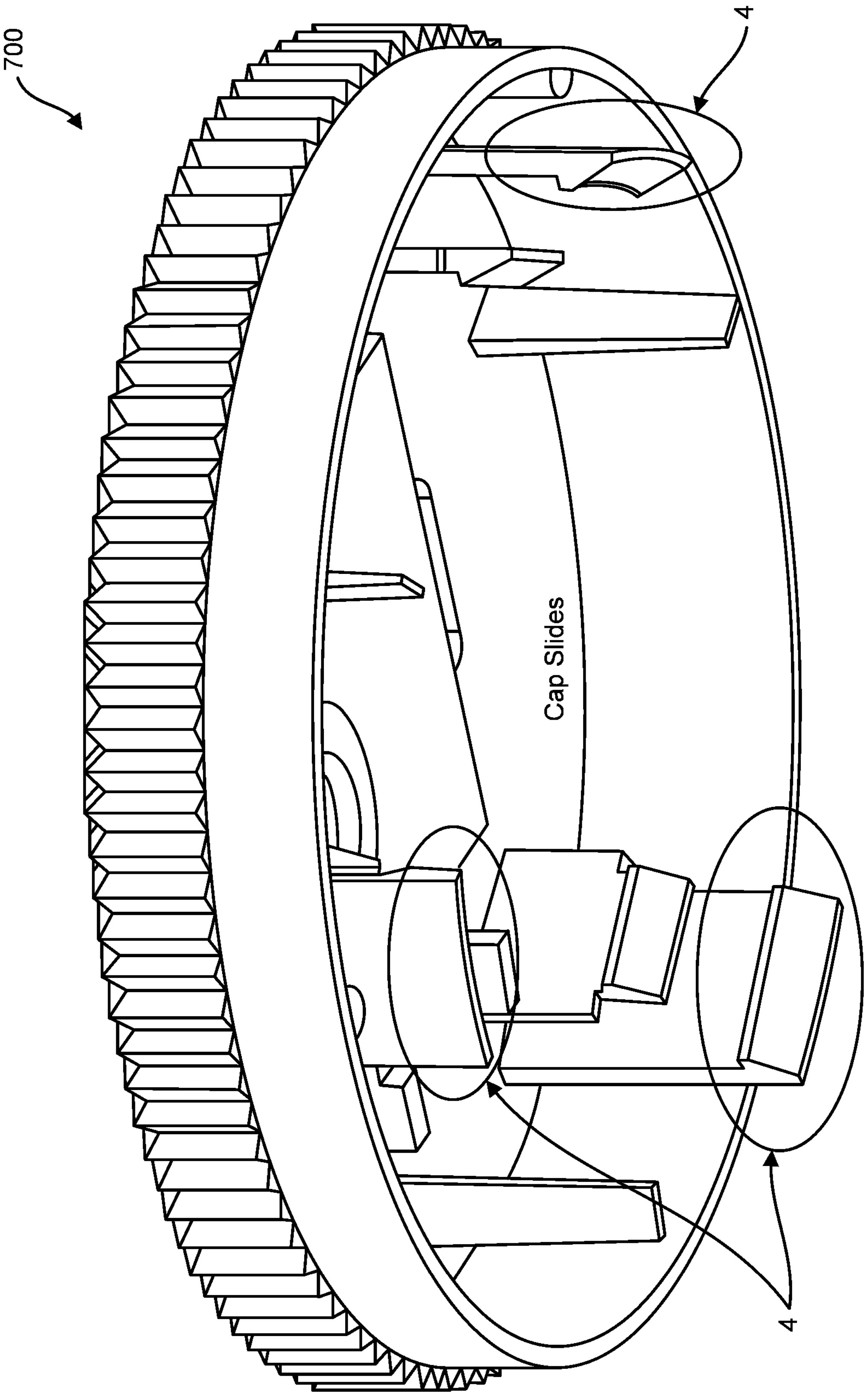
FIG. 9 illustrates another perspective view of an exemplary smart cap including one or more cap slides of one or more board snaps, according to some implementations of the current subject matter.
Figure 10:
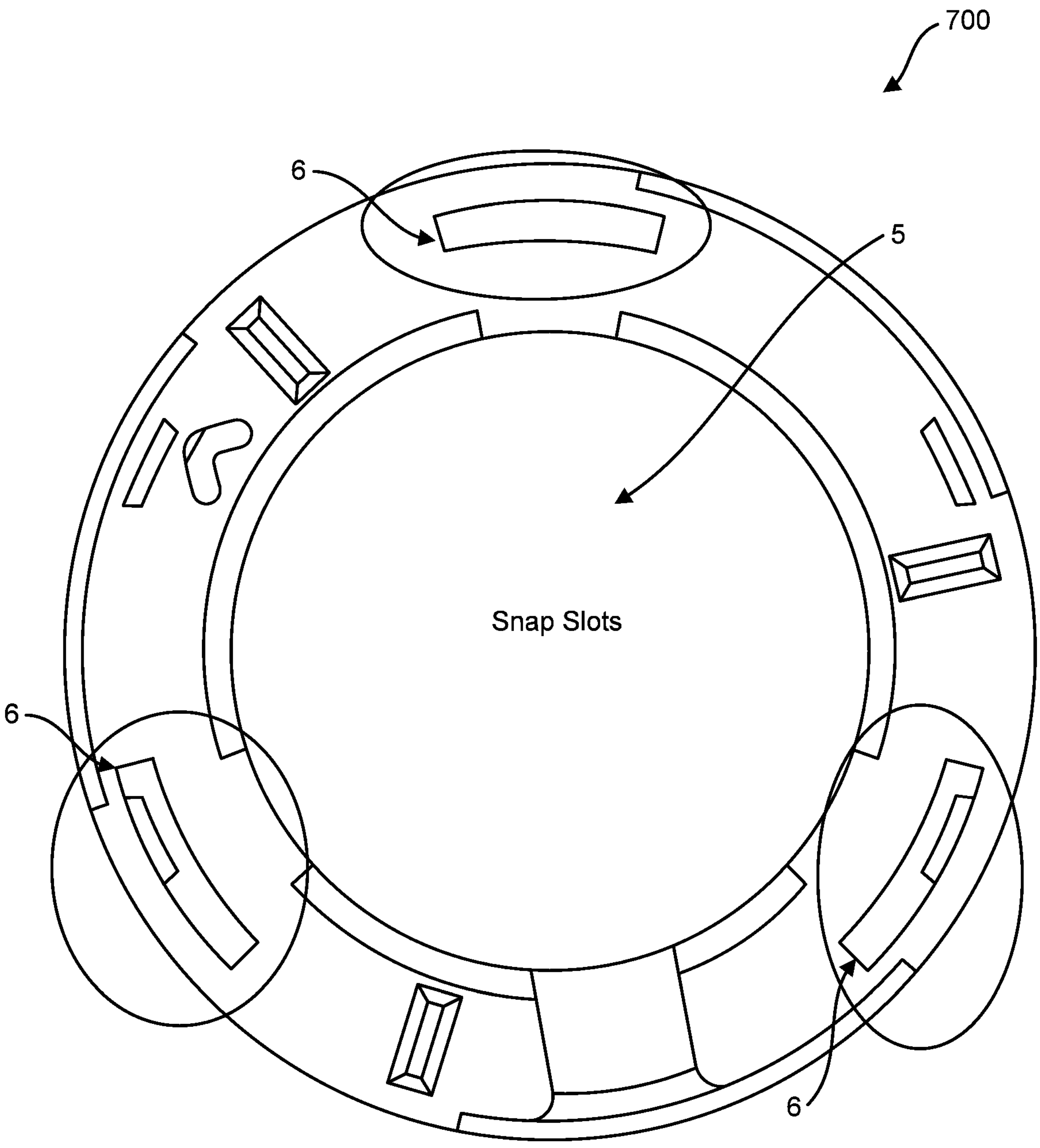
FIG. 10 illustrates a top view of an exemplary bottom cap having one or more snap slots, according to some implementations of the current subject matter.

FIG. 9 is another perspective view of the top cap portion of the smart cap 700, according to some implementations. As shown in FIG. 9, the smart cap 700 can include one or more cap slides 4 of the board snaps 2. The cap slides 4 can be configured to slide into snap slots 6 of the bottom cap portion 15 (as shown in FIG. 10, which is a top view of the bottom cap portion 15 having snap slots 6). Each of the cap slides 4 can have a wedge-shaped end, and/or any other shaped-end. Each of the cap slides 4 can be configured for one-way irreversible and/or reversible connection. The cap slides 4 can be configured to retain the board 3 by way of friction fit, tension fit, lock-and-key fit, and/or in any other way. The snap slots 6 can be slightly longer than the snap feature allowing about 1-2 degrees of rotation in either direction. The snap slots 6 and the cap slides 4 can be configured to secure the top cap portion 1 and the bottom cap portion 15 together. To do so, the cap slides 4 can be inserted into the snap slots 6, and then either the top cap portion 1 and/or the bottom cap portion 15 can be twisted (e.g., 1-2 degrees) to snap fit, lock-fit, friction fit, etc. the two portions together.

Figure 11:
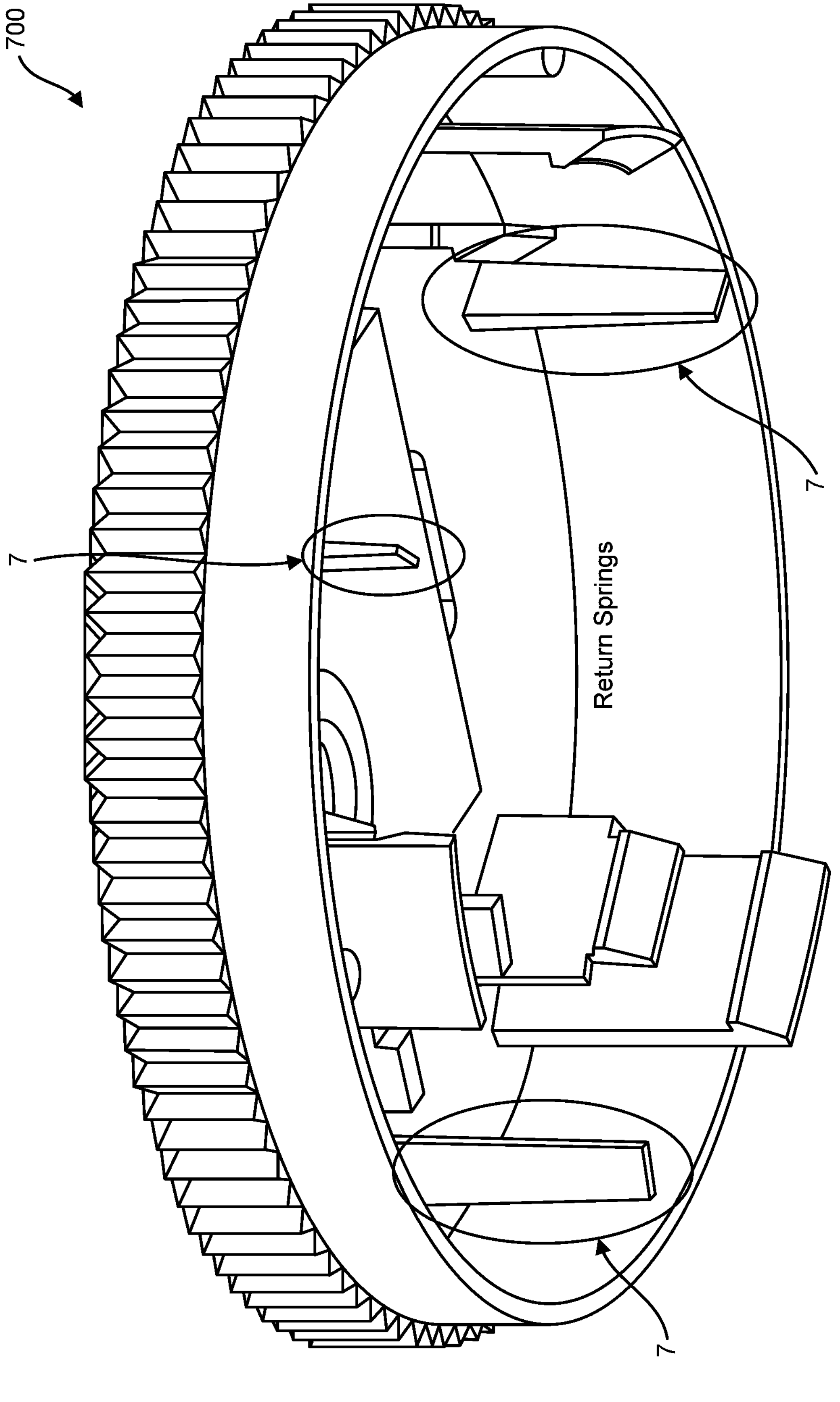
FIG. 11 illustrates a perspective view of an exemplary top cap having one or more return springs, according to some implementations of the current subject matter.
Figure 12:
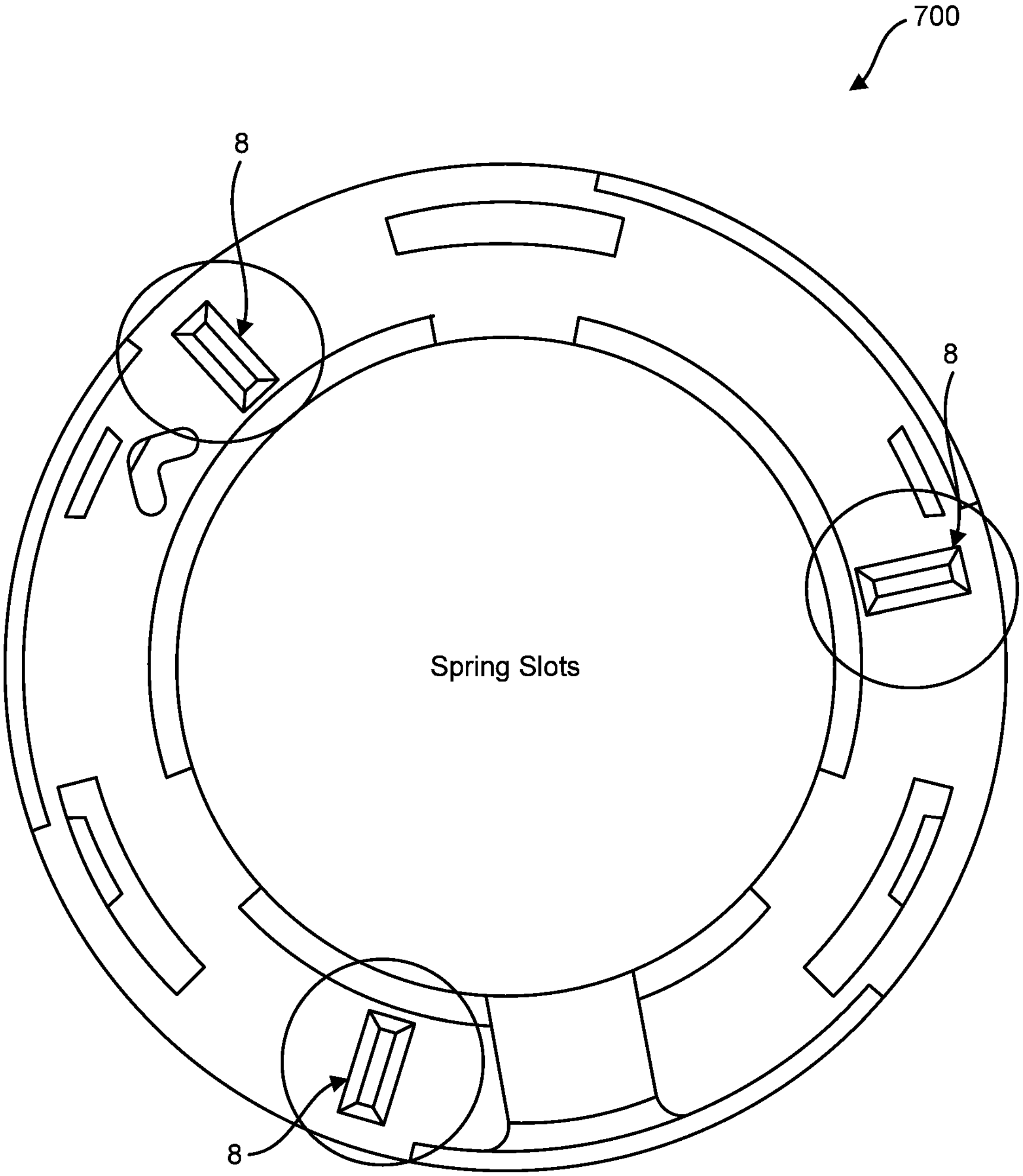
FIG. 12 illustrates a top view of an exemplary bottom cap having one or more spring slots configured to receive one or more returns springs, according to some implementations of the current subject matter.

FIG. 11 is a perspective view of the top cap portion 1 of the smart cap 700, according to some implementations of the current subject matter. FIG. 12 is a top view of the bottom cap portion 15 of the smart cap 700, according to some implementations of the current subject matter. As shown in FIG. 11, the top cap portion 1 can include one or more return springs 7 that can be configured to mate with the spring slots 8 (which can be configured to receive the return spring 7 upon coupling of the top and bottom cap portions 1 and 5) of the bottom cap portion 15 (as shown in FIG. 12). The return springs 7 can be plastic springs. When the top cap portion 1 is rotated with respect to the bottom cap portion 15, the return springs 7 can be configured to exert force to return to a neutral position. The return springs 7 can be configured to allow for release of the bottom cap portion 15 from the top cap portion 1. Each of the return springs 7 can have a wedge shape and/or any other desired shape.

Figure 13:
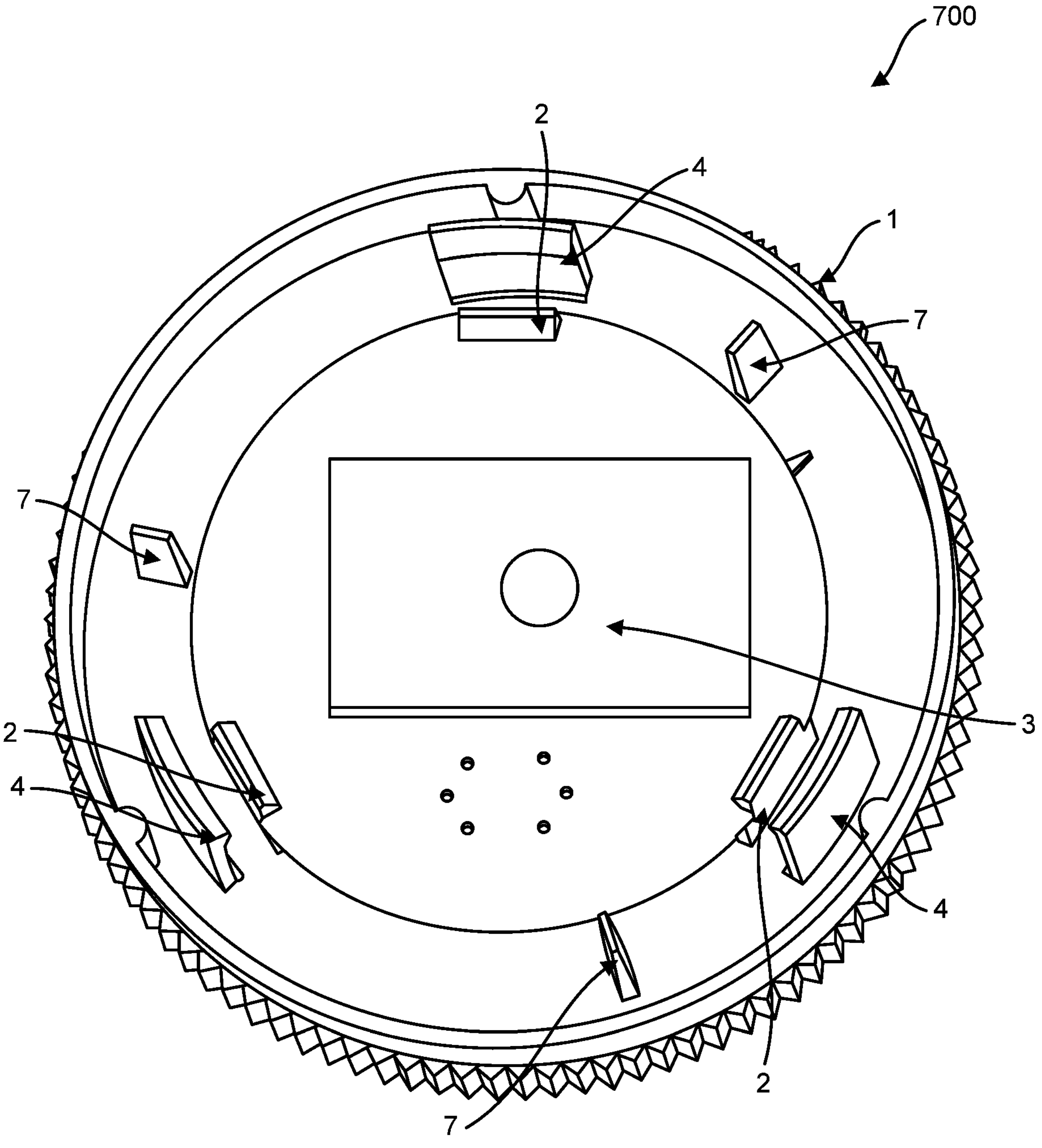
FIG. 13 illustrates a bottom perspective view of exemplary top cap, one or more board snaps configured to receive the board, one or more cap slides, and one or more springs, according to some implementations of the current subject matter.

FIG. 13 is a bottom perspective view of the top cap portion 1 of the smart cap 700, according to some implementations of the current subject matter. As shown in FIG. 13, the board snaps 2 have received and are securing the board 3 to the top cap portion 1. The cap slides 4 and the return springs 7 can be configured to be ready to releasably receive the bottom cap portion 15.

Figure 14:
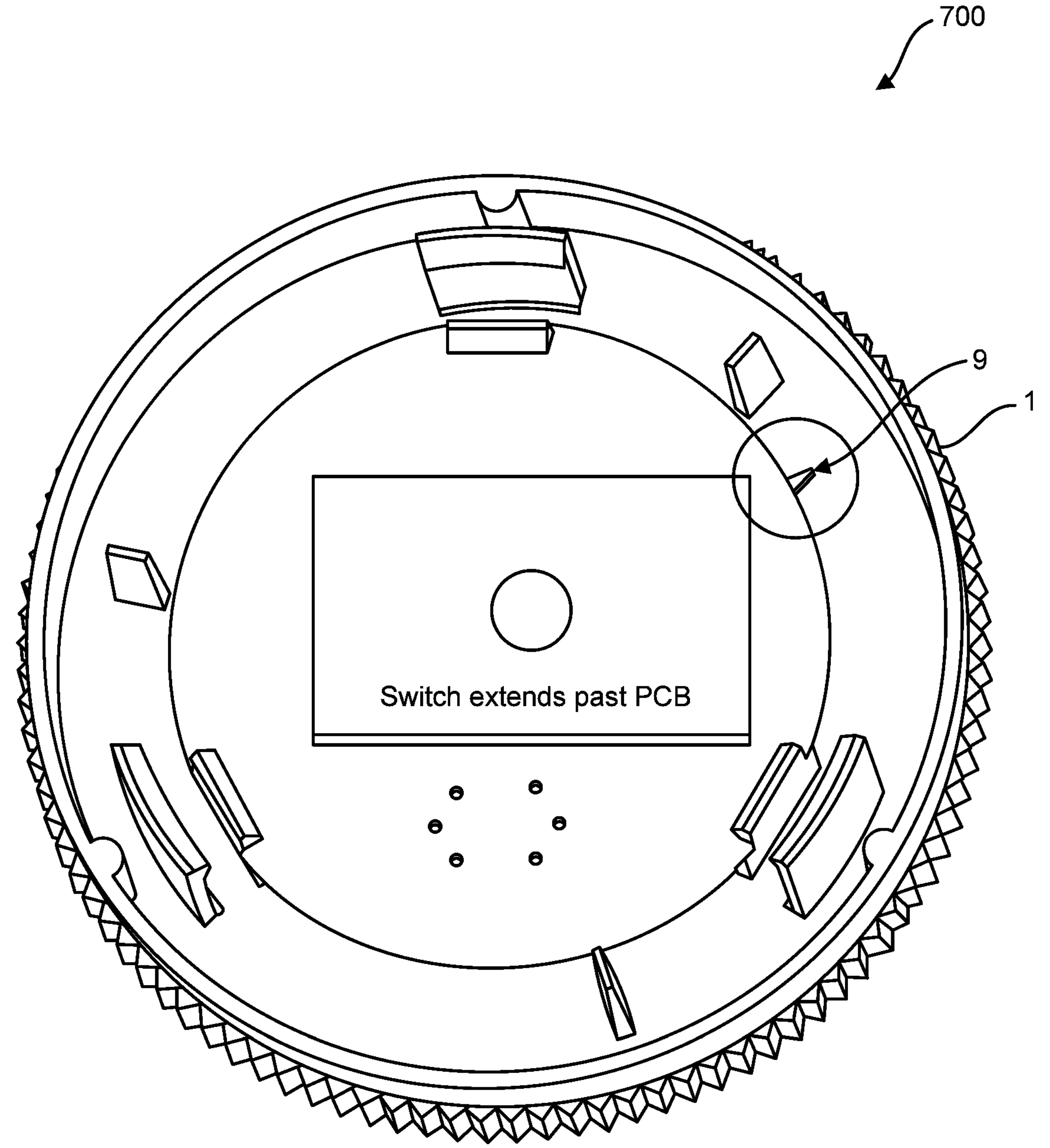
FIG. 14 illustrates a bottom perspective view of exemplary top cap, one or more board snaps configured to receive the board, one or more cap slides, one or more springs, and a switch, according to some implementations of the current subject matter.
Figure 15:
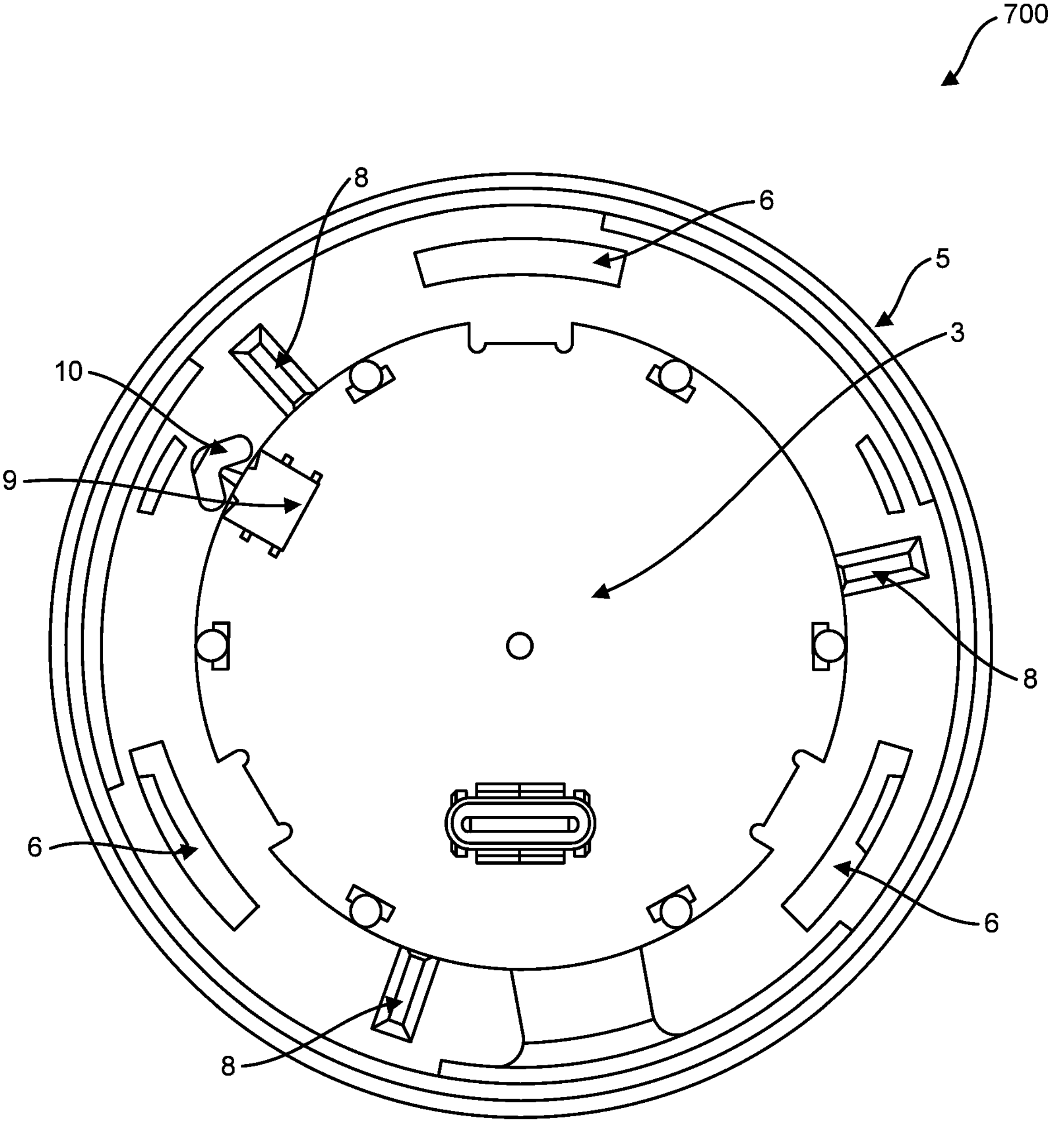
FIG. 15 illustrates an end view of exemplary bottom cap viewed down, one or more snap slots, one or more spring slots, a switch, and a switch toggle feature, according to some implementations of the current subject matter.

In some implementations, the top cap portion 1 can be configured to include a switch 9 that can be used for releasable securing of the top cap portion 1 (and/or the board 3) and/or the bottom cap portion 15. FIGS. 14-17 illustrate further details of the operation of the switch 9. As shown in FIG. 14, the switch 9 can be configured to extend beyond an edge of the board 3. The switch 9 can be configured to operate with a switch toggle feature 10 for release of the bottom cap portion 15 from the top cap portion 1. In particular, as shown in FIG. 15, the switch 9 can be positioned on the board 3 and the switch toggle feature 10 can be configured to be positioned on the bottom cap portion 15. One or more switches 9 and/or one or more switch toggle features 10 can be included in the top and/or bottom cap portions 1, 5. As is further shown in FIG. 15, the board 3 can be affixed to the top cap portion 1 and can rotate against the bottom cap portion 15.

Figure 16:
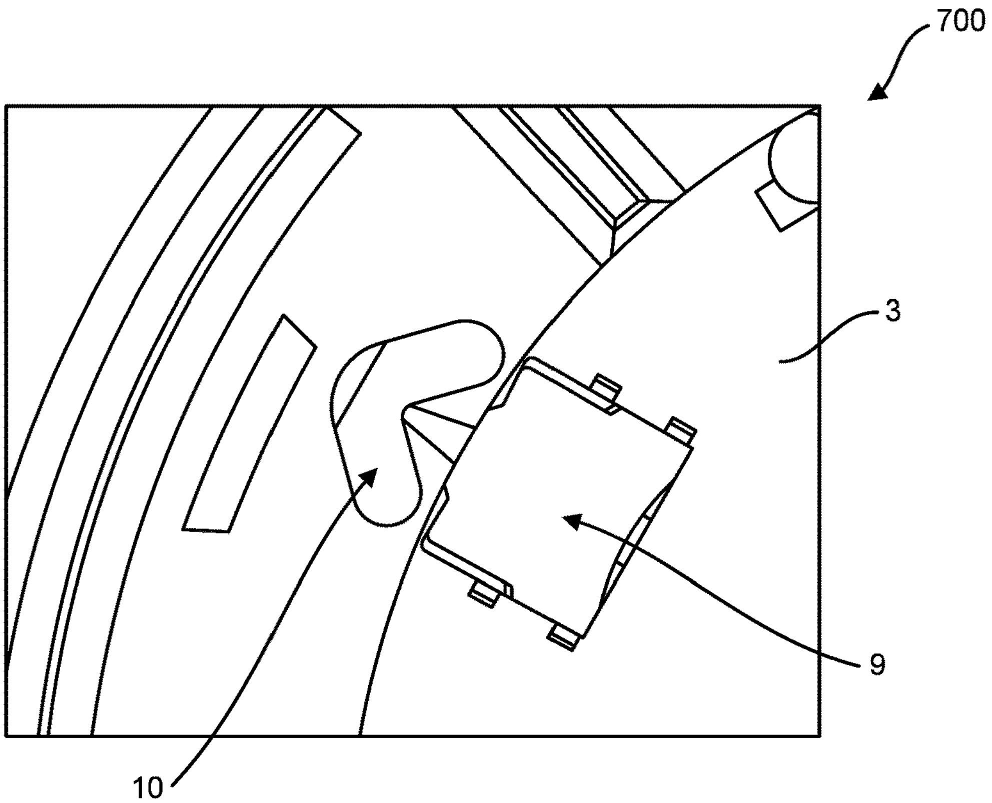
FIG. 16 illustrates a close-up of an exemplary switch and a toggle feature, according to some implementations of the current subject matter.
Figure 17:
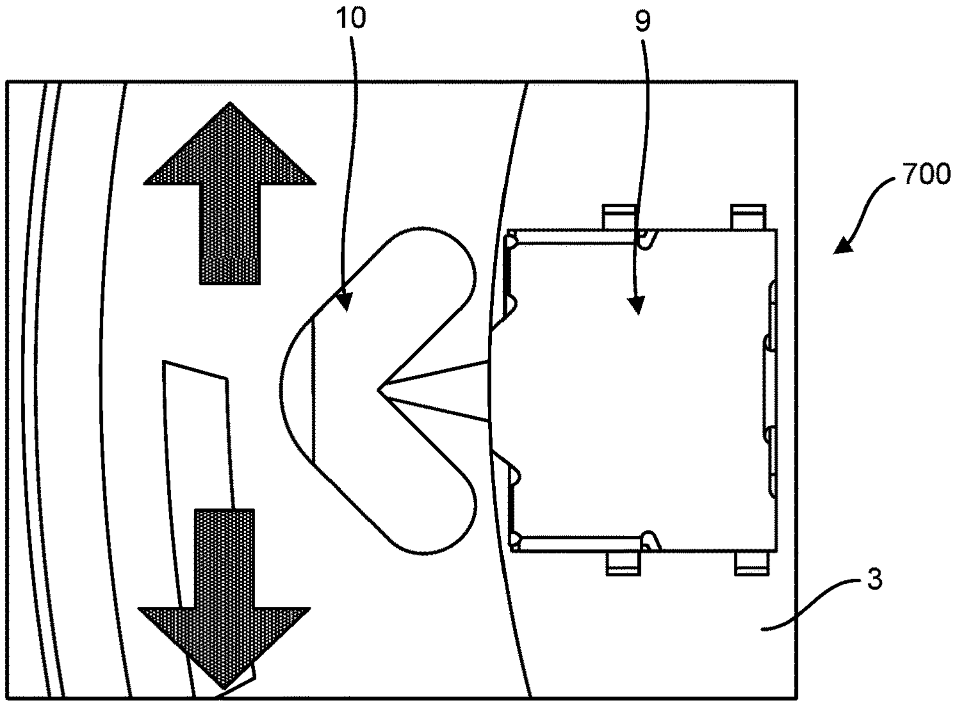
FIG. 17 illustrates a close-up of an exemplary switch and a toggle feature showing a switch detail, according to some implementations of the current subject matter.

As shown by the close-up views of FIGS. 16-17, the switch 9 can be affixed to the top cap portion 1, where the top cap portion 1 can rotate with respect to the bottom cap portion 15. The "<" shape of the switch toggle feature 10 can be configured to mechanically toggle the switch 9 direction (e.g., "up" or "down" arrows, as shown in FIG. 17) depending on the way the top cap portion 1 is rotated. Toggling of the switch 9 using the switch toggle feature 10 can be configured to release the top cap portion 1 from the bottom cap portion 15 and/or the board 3.

Figure 19:
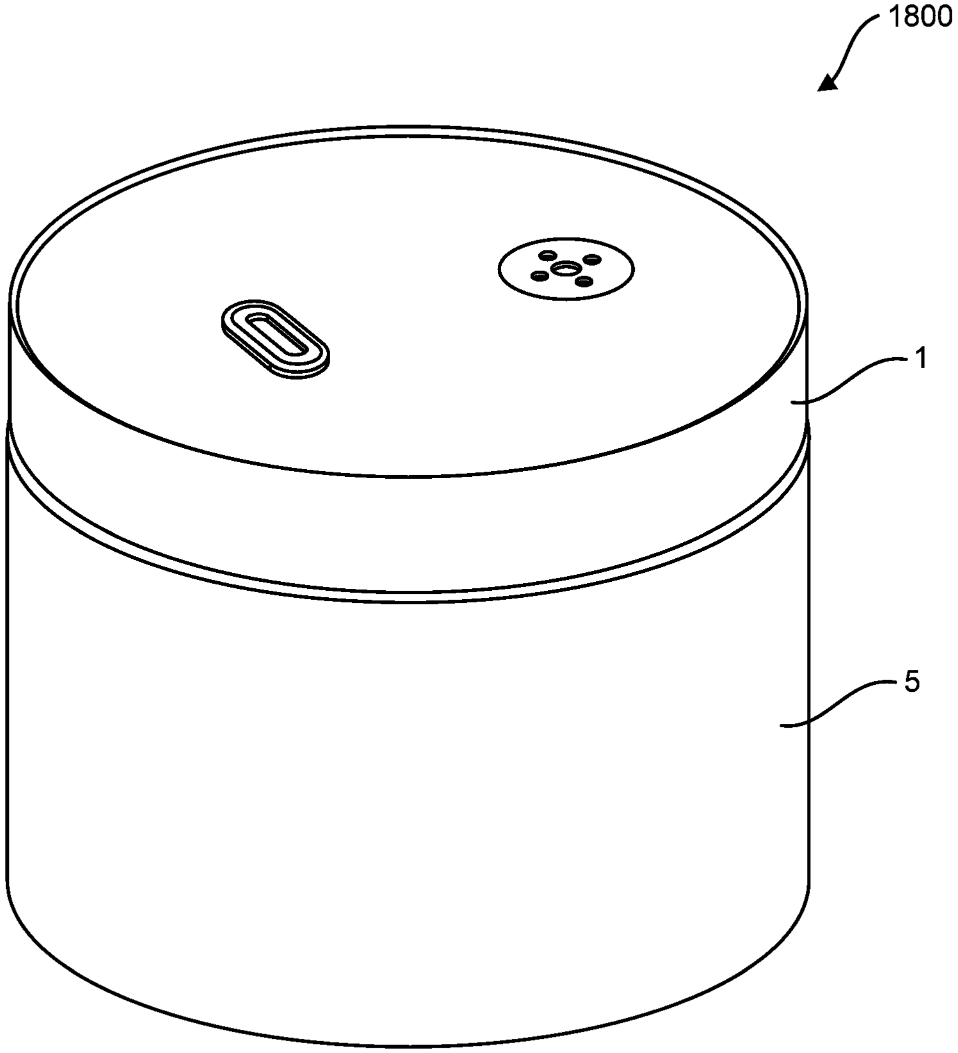
FIG. 19 illustrates an opaque view of an exemplary smart cap, according to some implementations of the current subject matter.

FIGS. 18-28 illustrate another exemplary implementation of the smart cap 1800, according to some implementations of the current subject matter. One or more features of the smart cap 1800 can be similar to those described with reference to the smart cap 100 and/or 700 shown in FIGS. 1 and 7 et seq., respectively, without limitation. Referring to FIGS. 18-28, the smart cap 1800 can include one or more of the following features in any desired combination, the top cap portion 1, the board (e.g., PCB) 3 with the connector 13, the bottom cap portion 15, one or more return springs 7, and one or more batteries 19. An existing medication container cap 16 can be configured to fit and/or be otherwise positioned in an interior of the bottom cap portion 15, as shown in FIGS. 18-19. In particular, FIG. 18 is a transparent isometric view of the smart cap 1800 that has been positioned over and encompassing the existing cap 16 therein. FIG. 19 is an opaque view of the smart cap 1800, whereby the existing cap 16 can be contained within the interior portion of the bottom cap portion 15 (not visible in FIG. 19).

Figure 20:
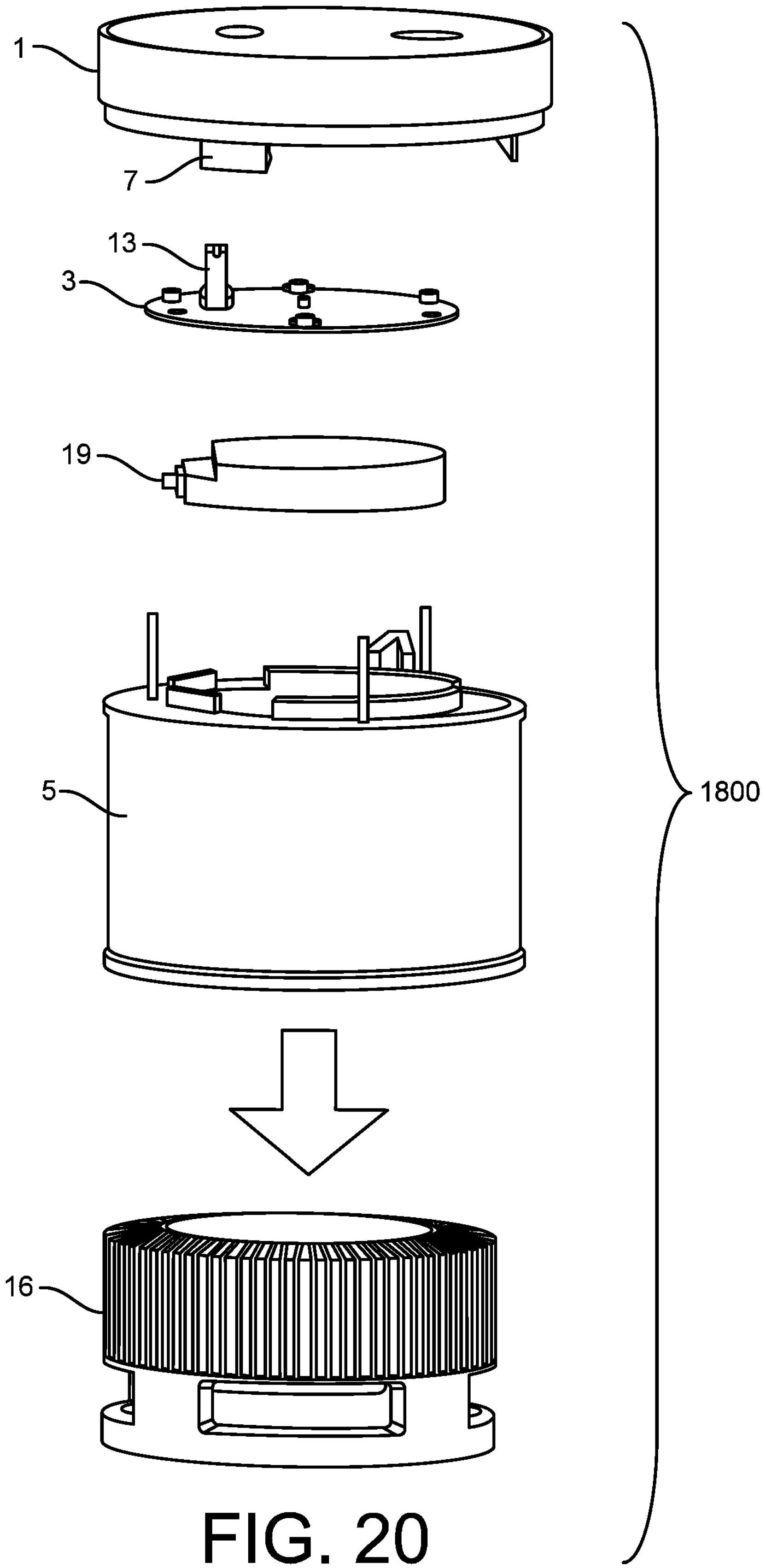
FIG. 20 illustrates an exploded view of one or more components of an exemplary smart cap, according to some implementations of the current subject matter.

FIG. 20 is an exploded view of various components of the smart cap 1800, according to some implementations of the current subject matter. As shown in FIG. 20, the bottom cap portion 15 can be positioned over the existing medication container cap 16 by sliding the bottom cap portion 15 over the cap 16. The bottom cap portion 15 can be positioned by itself over the cap 16 and/or while it coupled to the top cap portion 1 (including the board 3, the battery 19 and/or any other mechanical and/or electrical components) using the one or more return springs 7 and/or any other locking features. The components of the smart cap 1800 can be secured (either permanently and/or releasably) to each other using one or more locking features discussed above with regard to FIGS. 7-17.

Figure 21:
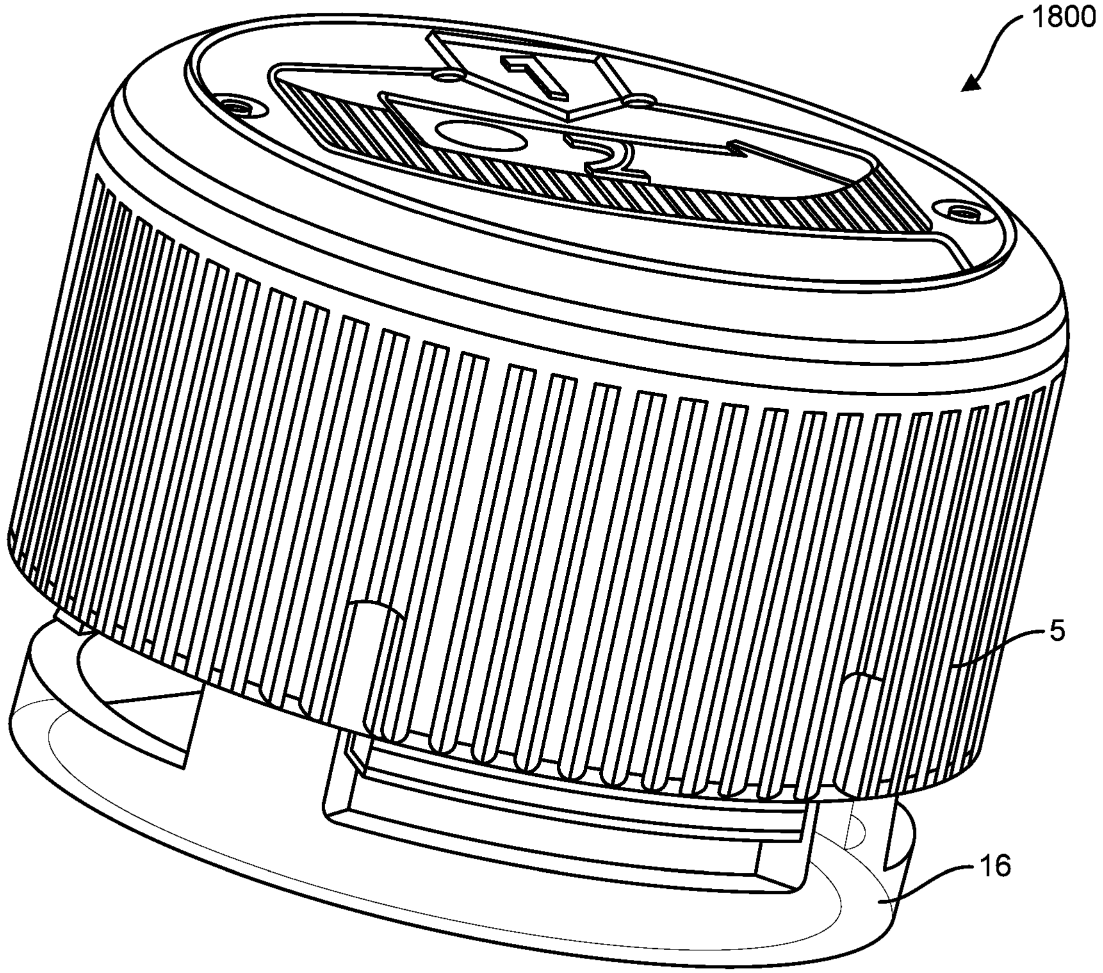
FIG. 21 illustrates a perspective view of another exemplary smart cap, according to some implementations of the current subject matter.
Figure 22:
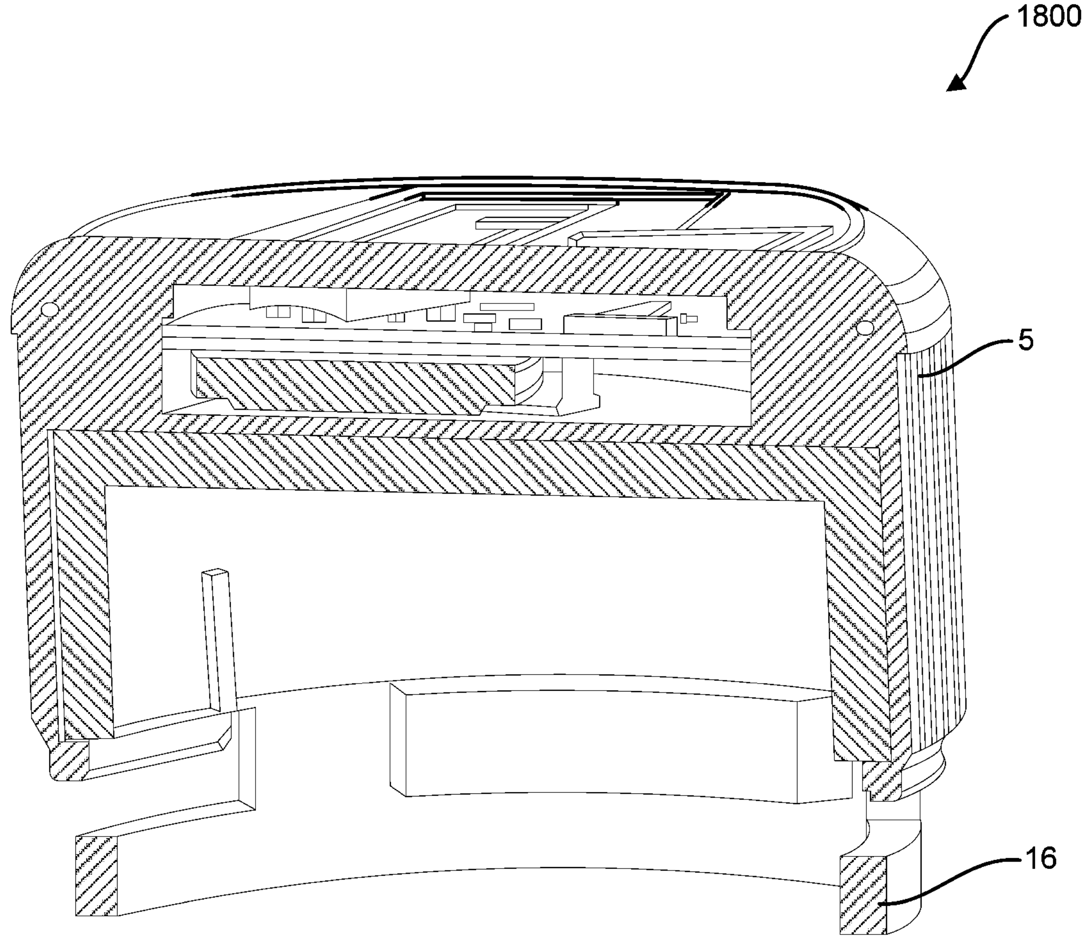
FIG. 22 illustrates a side cross-sectional view of another exemplary smart cap, according to some implementations of the current subject matter.

Positioning of the existing cap 16 in an interior bottom cap portion 15 is further illustrated in FIGS. 21-22. In particular, FIG. 21 is a perspective view of the smart cap 1800 partially covering the existing cap 16. FIG. 22 is a side cross-sectional view of the smart cap 1800 shown in FIG. 21. As shown in FIGS. 21-22, the existing cap 16 can be configured to fit partially inside the bottom cap portion 15. Alternatively, or in addition, the existing cap 16 can be configured to fit fully inside the bottom cap portion 15. The existing cap 16 can be permanently and/or temporarily secured inside the bottom cap portion 15. For example, one or more locking features (e.g., return springs 7, slides 6, and/or any other features) can be configured to hold the existing cap 16 inside the bottom cap portion 15. Some non-limiting examples of such holding mechanisms can include a snap-fit, a friction fit, a lock-and-key fit, and/or any other fit.

Figure 23:
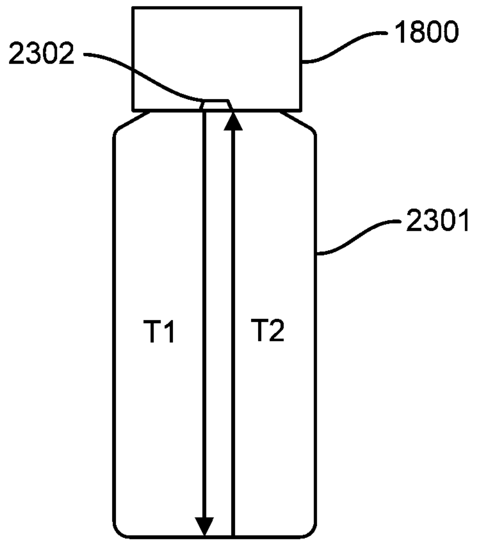
FIG. 23 illustrates a side-cross sectional view through an empty bottle that can be used for calibration, according to some implementations of the current subject matter.
Figure 24:
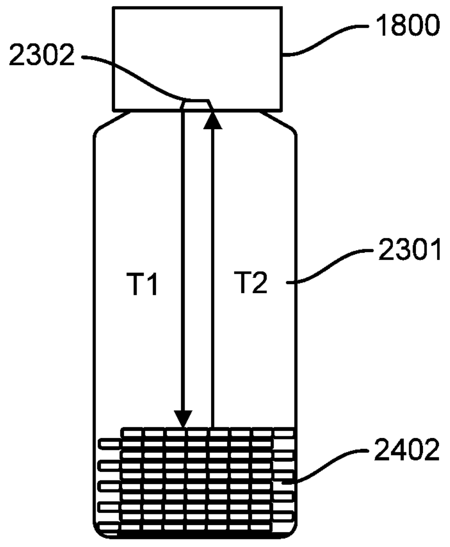
FIG. 24 illustrates a side-cross-sectional view through a partially full bottle, according to some implementations of the current subject matter.

In some implementations, the smart cap (e.g., 100, 700, 1800) can include an electronic medication (e.g., "e-pill") volume system. The e-pill volume system can be configured to measure and/or determine a volume of medication contained within the medication container on which the smart cap has been positioned. In some exemplary, non-limiting implementations, the smart cap can be configured to use a time of flight (ToF) method to determine volume of the medication contained and/or remaining in the medication container. As shown in FIGS. 23-24, the smart cap 1800 can be configured to include a ToF sensor 2302 that can be communicatively coupled to microprocessor 605 shown in FIG. 6, where the microprocessor 605 can be configured instruct the sensor to perform ToF measurements, calibration, and transmit data to the microprocessor 605 upon measurement. The microprocessor 605 can receive a trigger (e.g., from an accelerometer, magnetometer, etc.) indicating that an amount of medication in the medication container may have changed, and can determine that an updated ToF measurement may be required. Any date that the microprocessor 605 receives from the sensor 2302 (and/or any other component of the smart cap) can be stored in one or more memory and/or storage locations.

The sensor 2302 can be configured to be positioned in the smart cap 1800, such as, for example, the bottom cap portion 15, as shown in FIG. 23. The sensor 2302 can be used to accurately measure a distance between the bottom surface of the smart cap (e.g., position of the sensor 2302) and a top of medication contained in the medication container. The ToF sensor 2302 can be configured to measure photons of light from transmission to reception, instead of measuring a strength of the return signal. The ToF sensor 2302 can maintain its accuracy across variations in material density. In an exemplary implementation, the ToF sensor 2302 can be embedded in the smart cap and aimed toward a bottom of the medication container, as shown in FIGS. 23-24. For example, the specified range of the sensor 2302 can be accurate to approximately 0.5 mm (approximately 0.01969 inch) at a range of between approximately 0 mm (approximately 0 inch) and approximately 100 mm (approximately 3.937 inches). To calibrate the sensor 2302, as shown in FIG. 23, an empty medication container 2301 can be used. The time from a photon being released (i.e., T1) and the time it takes to return (i.e., T2) can represent a round-trip time for the photon's excursion, ΔT. When medications (e.g., pills, liquid, powder, etc.) are added to the medication container 2301, ΔT can be determined again by directing signals toward the medication in the container 2301 and measuring time signals T1 and T2 and the corresponding time difference. In the example shown in FIG. 24, ΔT can correspond to a smaller value since the photons emitted from the ToF sensor 2302 will return faster. This difference in signal return speed can be used to determine a percentage of volume change over the calibrated empty bottle. As can be understood, other technologies can be used to measure the amount of medication remaining and/or contained within the medication container.

Figure 25:
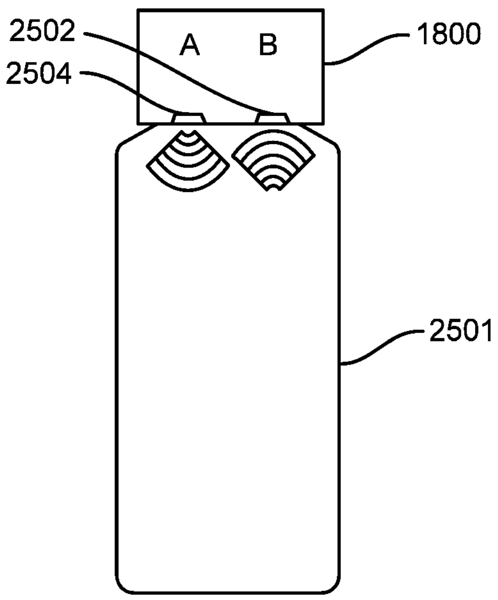
FIG. 25 illustrates a side-cross sectional view through an empty bottle that can be used for calibration, according to some implementations of the current subject matter.
Figure 26:
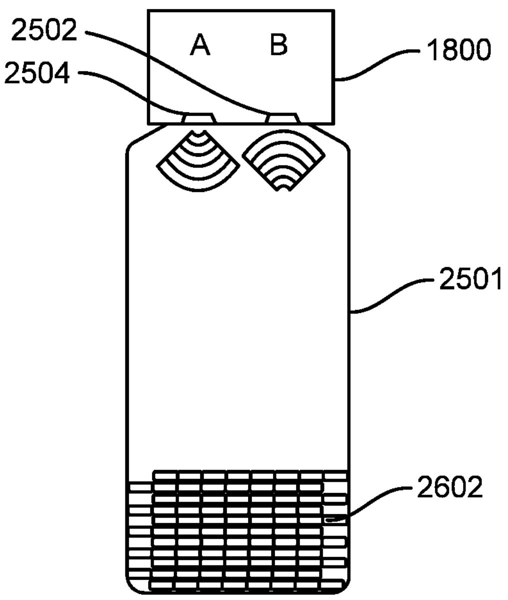
FIG. 26 illustrates a side-cross-sectional view through a partially full bottle, according to some implementations of the current subject matter.

In some implementations, the smart cap 1800 (and/or 100, 700) can be configured to measure air volume by measuring acoustic resonance. Referring to FIGS. 25-26, the smart cap 1800 can include one or more signal generators A 2502 and one or more signal receivers B 2504. The signal generators can be transducers. A signal generator 2502 can generate a series of pulsed fixed frequencies (e.g., through a transducer A). The transducers 2502 can be a speaker and/or other type of electrically resonant device. The signals can be in the audible and/or subaudible range. The purpose is to resonate the frequencies inside the enclosed cavity of the medication container 2501. The receiver B 2504 can be a microphone and/or other signal receiving device, and can be configured to sample the audio during the periods that the frequency pulses generated by the transducer A 2502 are turned off, e.g., 180 degrees out of phase. The empty medication container 2501 can resonate in response to the injected signals. The measured resonance and/or harmonics of the injected signals can be directly related to a distance of the medication from the transducer pair. The empty medication container 2501 can have fundamental characteristic resonant frequencies in response to the injected signals. These can be determined and/or stored by the system 600 shown in FIG. 6 to represent an empty medication container 2501. As the distance of the medication from the transducer pair changes, e.g., as medication are added to the container 2501 thereby reducing the distance, the fundamental resonating frequencies and/or harmonics can change proportionally to the distance.

In some implementations, the smart cap (e.g., 100, 700, 1800) can include a medication counter. For example, the medication counter can be provided on a collar of the medication container. An infrared (IR) interrupter medication counter can be configured to count medications as they break an IR beam. Alternatively, or in addition, the smart cap can include a weight sensor to determine weight and/or volume of medications remaining in the medication container, and based on a known initial total weight of the medication and remaining medication weight determine how much medication is left in the medication container.

Figure 27:
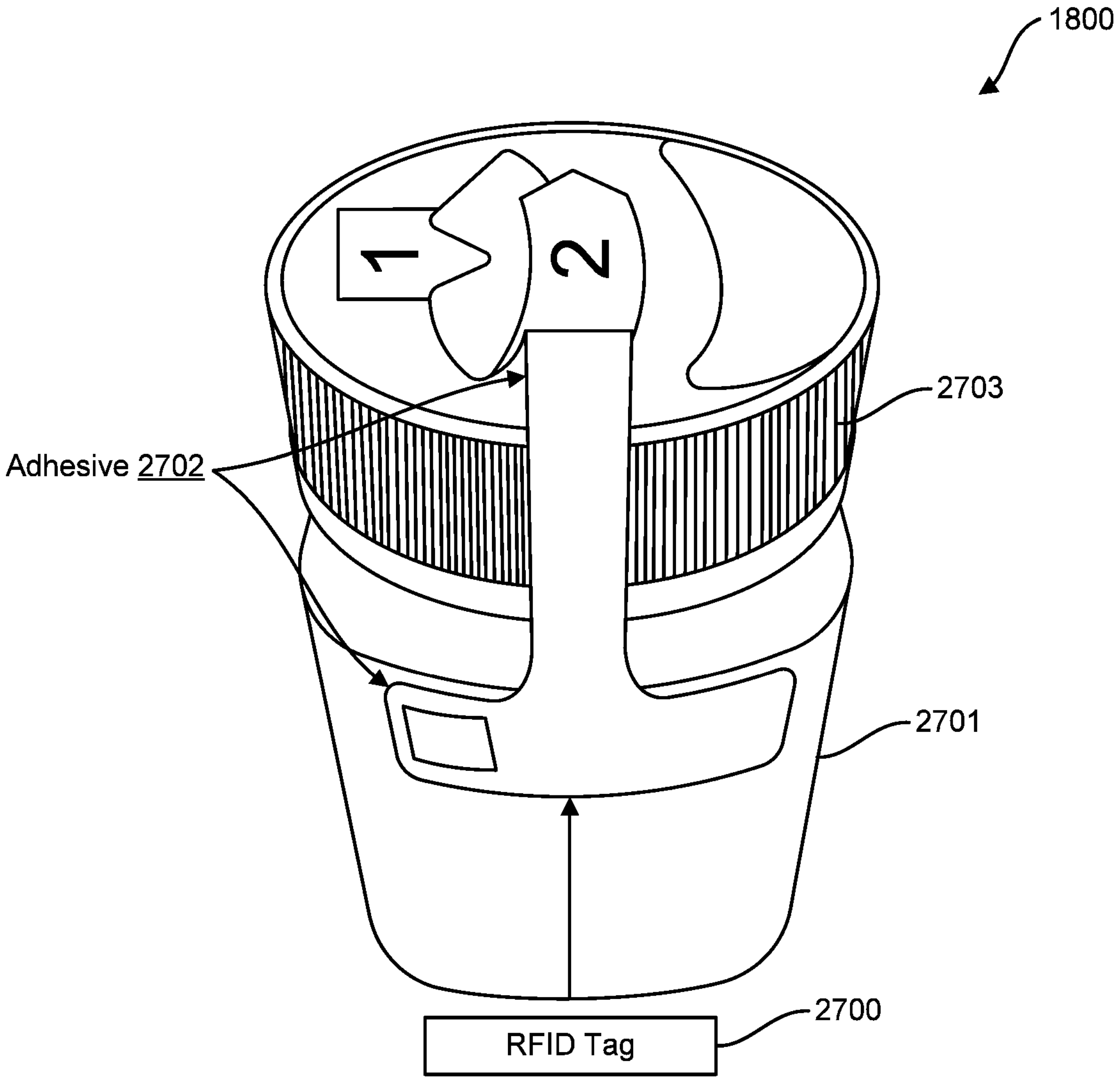
FIG. 27 illustrates a perspective view of an exemplary radio-frequency identifying (RFID) label, according to some implementations of the current subject matter.

In some implementations, the smart cap (e.g., 100, 700, 1800) can include cap-medication pairing. The pairing can be executed by one or more components of the architecture 600 shown in FIG. 6. This may be useful in situations, where the user is using multiple smart caps (e.g., 100, 700, 1800). Thus, a smart cap (e.g., 100, 700, 1800) placed on the wrong medication container and/or medicine carrier can potentially impact the user's proper medication dosing. "Pairing" a smart cap with its associated medication container can be configured to alert the user in case the smart cap and the medication container are mismatched. In some exemplary, non-limiting implementations, the pairing method can implement a processor-capable of near-field communication (NFC), an antenna and a unique, associated radio-frequency identifying (RFID) label 2700 placed on the medication container 2701, as shown in FIG. 27 (e.g., FIG. 27), which can be a conventional pill bottle or a bottle equipped with the smart cap (e.g., 100, 700, 1800). For example, the RFID label 2700 can be affixed using an adhesive 2702 to a conventional cap 2703 of the bottle 2701. The label 2700 can bear information including "Open Bottle to Break Seal". By way of a non-limiting example, the label 2700 can be configured to have a T-shape with a body of the RFID tag on the bottle 2701, and an arm extending over and edge and/or top of a cap 2703 of the bottle 2701, as shown in FIG. 27.

An NFC component (not shown in FIG. 27) can induce an electric field into any nearby RFID label (e.g., label 2700). The strength of the NFC signal can be adjusted to restrict the field of influence to just the nearby label 2700 component. The label 2700 can respond with a unique data key. The cap-label association can be periodically checked to ensure continued pairing of the associated components. If a periodic scan fails and/or receives an improper label data in response, the user can be alerted to the cap being off the medication and/or not near the associated medication container 2701. The user can be alerted using one or more of the audio methods discussed above and/or using the display screen, as discussed above.

Figure 28:
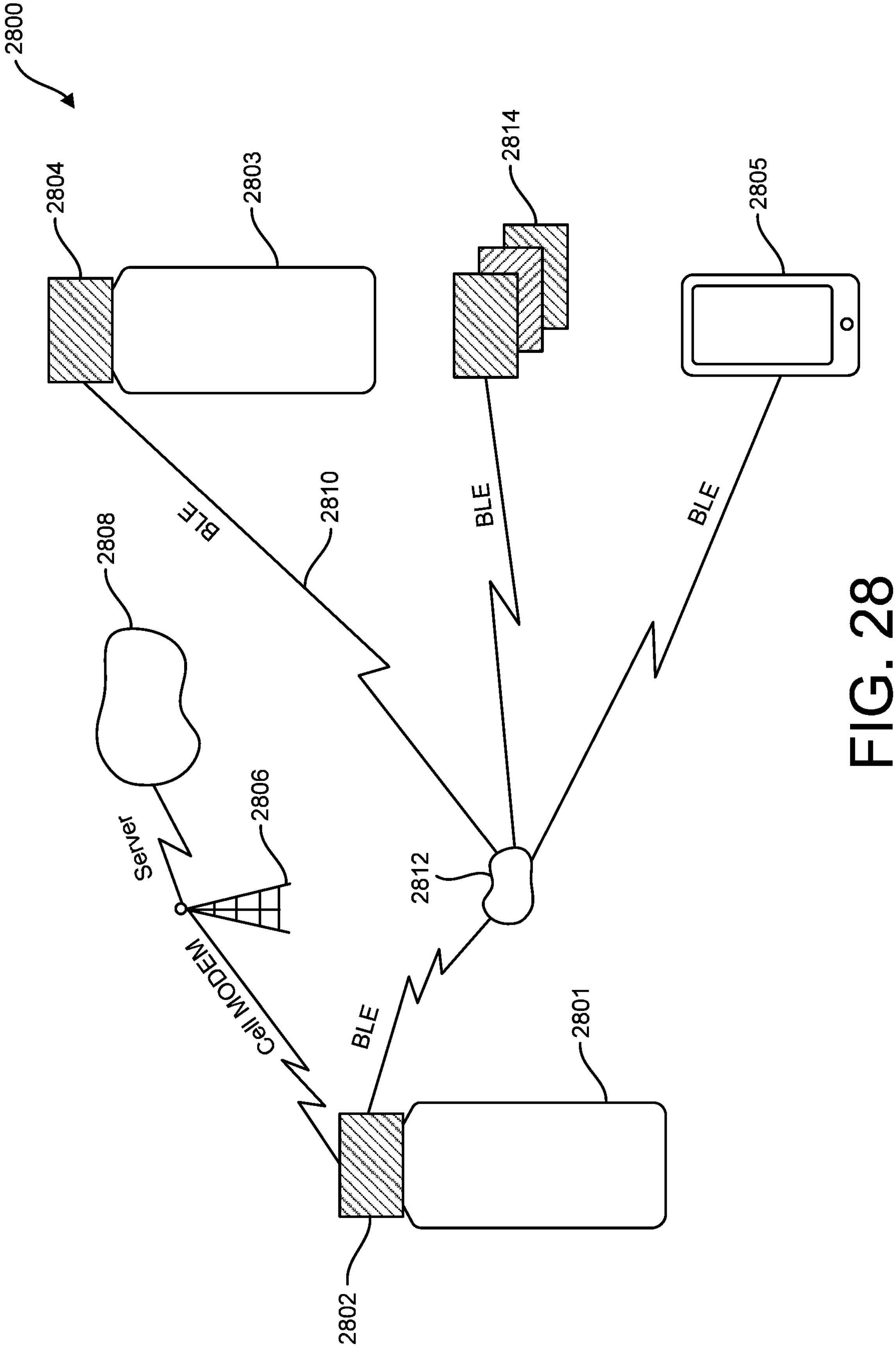
FIG. 28 illustrates an exemplary system diagram of a smart cap configured with a Bluetooth low energy (BLE) radio communication capabilities, according to some implementations of the current subject matter.

In some implementations, the current subject matter can be configured to implement one or more connected smart caps (e.g., caps 100, 700, 1800). FIG. 28 illustrates a connected smart cap system 2800, according to some implementations of the current subject matter. The system 2800 can include one or more primary smart caps 2802 (e.g., caps 100, 700, 1800) coupled to a medication container 2801 and one or more secondary smart caps 2804 (e.g., caps 100, 700, 1800) coupled to a medication container 2803. The system 2800 can also include a cell server or a cell modem 2806, a server 2808, and a network 2812. One or more devices shown in FIG. 2800 can be configured to communicate to one another using one or more wired and/or wireless connections, such as Bluetooth Low Energy (BLE), Wi-Fi, NFC, etc., 2810.

As shown, for example, in FIG. 28, the primary smart cap 2802 can be configured to communicate (e.g., using wired, wireless, etc. connection) with the cell server/modem 2806, which in turn can communicate with a server 2808, such as, to obtain various information relating to medications that may be contained, used, etc. in one or more of the containers 2801, 2803. The smart cap 2802 can communicate with the network 2812 using, for example, a BLE connection. The network 2812 can be an ad-hoc wireless network, a PicoNETs, and/or any other network that can enable communication between other BLE-capable devices including the secondary smart cap 2804. The primary smart cap 2802 can transmit and/or receive via the network 2812 various data (e.g., medications, refill reminders, etc.) to/from the second smart cap 2804, an external wireless device (e.g., a smartphone, a computer, etc.) 2805, and/or any other form factor devices 2814 (e.g., blister packs, storage vaults, auto injectors, and/or other medication delivery methods/devices, etc.). The device(s) 2805 can be equipped, for example, with a smartphone application, and can enable another path for alarms, notifications, status, etc. The smartphone application can be configured for local configuration parameters, such as audio level, LED alert pattern, duration, etc.

In some implementations, a single primary smart cap 2802 can be configured to act as a data conduit between various devices. The cap 2802, in addition to saving the cost of multiple modems at a user's location, can be configured to consolidate all of a user's smart-enabled medication storage devices under one account and/or data stream.

Figure 29:
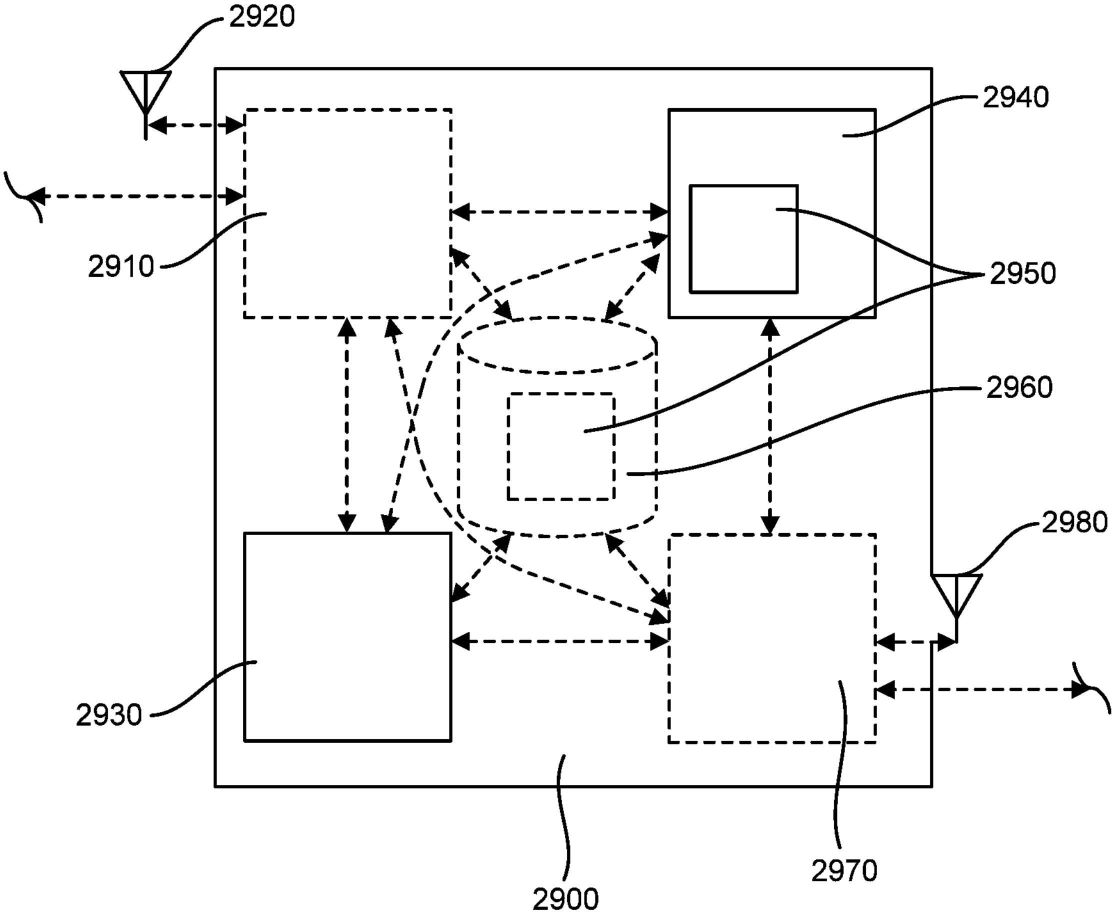
FIG. 29 illustrates an exemplary system, according to some implementations of the current subject matter.

FIG. 29 is a schematic diagram of a computer device or system including at least one processor and a memory storing at least one program for execution by the at least one processor, according to some implementations of the current subject matter. Specifically, FIG. 29 depicts a computer device or system 2900 comprising at least one processor 2930 and a memory 2940 storing at least one program 2950 for execution by the at least one processor 2930. In some implementations, the device or computer system 2900 can further comprise a non-transitory computer-readable storage medium 2960 storing the at least one program 2950 for execution by the at least one processor 2930 of the device or computer system 2900. In some implementations, the device or computer system 2900 can further comprise at least one input device 2910, which can be configured to send or receive information to or from any one of: an external device (not shown), the at least one processor 2930, the memory 2940, the non-transitory computer-readable storage medium 2960, and at least one output device 2970. The at least one input device 2910 can be configured to wirelessly send or receive information to or from the external device via a means for wireless communication, such as an antenna 2920, a transceiver (not shown) or the like. In some implementations, the device or computer system 2900 can further comprise at least one output device 2970, which can be configured to send or receive information to or from any one from the group consisting of: an external device (not shown), the at least one input device 2910, the at least one processor 2930, the memory 2940, and the non-transitory computer-readable storage medium 2960. The at least one output device 2970 can be configured to wirelessly send or receive information to or from the external device via a means for wireless communication, such as an antenna 2980, a transceiver (not shown) or the like.

Figure 30:
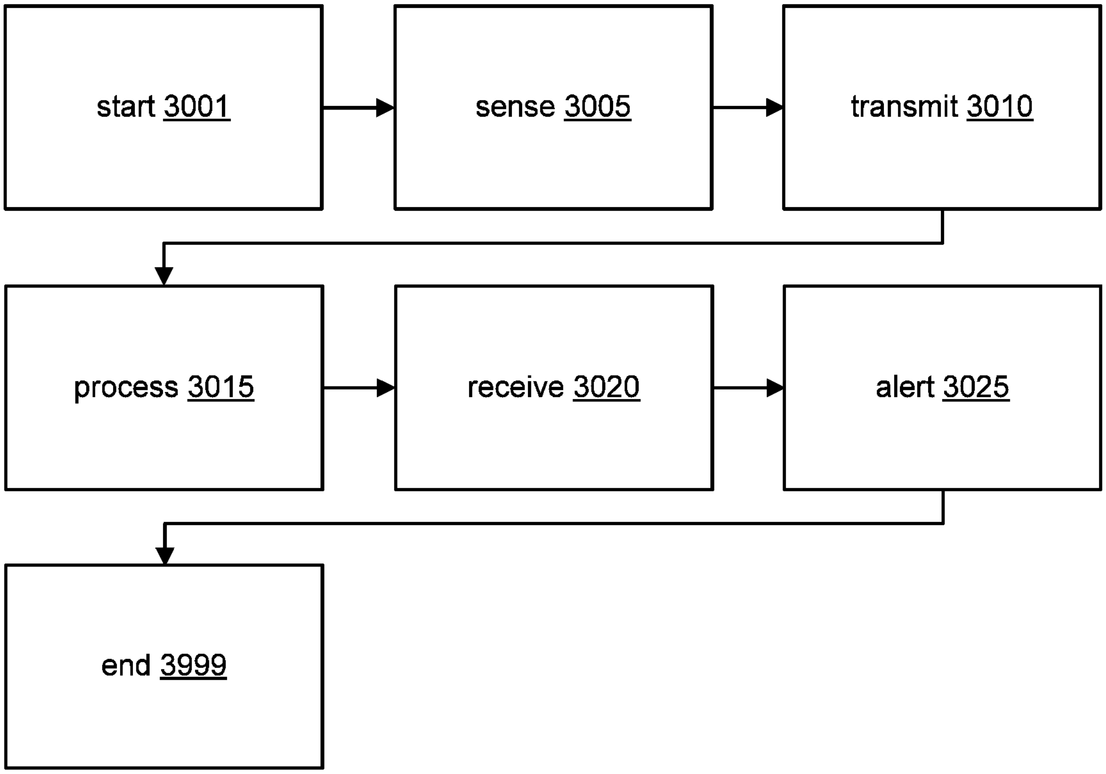
FIG. 30 illustrates an exemplary process, according to some implementations of the current subject matter.

The smart cap (e.g., 100, 700, 1800) can be operated in accordance with a process 3000, as shown in FIG. 30, for example. The process 3000 can include a start 3001, a sensing step 3005, a transmitting step 3010, a processing step 3015, a receiving step 3020, an alerting step 3025, and an end step 3999. The sensing 3005 can include detecting an orientation of the smart cap (e.g., 100, 700, 1800), and sensing contents of the medication container proximate the smart cap (e.g., 100, 700, 1800). The sensing 3005 can include one or more processes shown in FIGS. 23-26. The transmitting and receiving steps 3010 and 3020 can include NFC, BLE, cellular, wireless, etc. communication. The processing 3015 can be local, distributed and/or cloud based, such as using architecture/system 600 shown in FIG. 6. The alerting 3025 can include audio, visual and/or vibratory feedback (e.g., generated by one or more of a speaker 650, a piezoelectric vibrator, OLED 665, LEDs 670, etc., as shown in FIG. 6). The process 3000 can be triggered by movement of the smart cap (e.g., 100, 700, 1800) detected by one or more of the accelerometer 620 (as shown in FIG. 6) or a magnetometer. The process 3000 can be further triggered by movement of a switch (e.g., switch 9, toggle switch 10, cap detect switch 675, etc., as shown in FIGS. 1-6). In lieu or in addition to near field and/or wireless communication, the connection 13 (e.g., USB) can be used.

In some implementations, the current subject matter relates to an exemplary medication container cap for performing medication management. An exemplary medication container cap or smart cap is illustrated in FIGS. 1-30 (e.g., cap 100, 700, 1800). The cap can include a top cap portion (e.g., portion 1) configured to be coupled to a bottom cap portion (e.g., portion 15). The bottom cap portion can have an interior portion configured for insertion of at least one of: another cap (e.g., conventional cap 16), a portion of a medication container (e.g., a standard bottle), and any combination thereof. The top cap portion can be further configured to include at least one processor (e.g., microprocessor 605 shown in FIG. 6) and at least one communication module (e.g., elements 625, 630, 635 shown in FIG. 6). The processor can be configured to generate at least one message (e.g., medication alert, refill alert, power supply alert, communication alert, etc.) using at least a data received by at least one of: the communication module and the processor. The messages may be generated by the processor and displayed by a display (e.g., display 11), announced by a speaker (e.g., speaker 14), and/or visualized by one or more LEDs 18.

In some implementations, the current subject matter can include one or more optional features. As stated above, another cap can include a cap of a standard pill bottle.

In some implementations, the medication container cap can include a circuit board (e.g., PCB 3) configured to be positioned in an interior portion of the top cap portion. The circuit board can be configured to include at least one of the following: the processor (e.g., microprocessor 605), the communication module, a display module (e.g., display 11), an audio module (e.g., speaker 14), one or more visual indicators (e.g., LEDs 18), a power module (e.g., circuit 610), and any combination thereof.

In some implementations, the circuit board can be configured to be secured in the interior portion of the top cap portion using one or more board snaps (e.g., snaps 2). The board snaps can be configured to secure the circuit board using at least one of: releasably securing the circuit board in the interior portion of the top cap portion and permanently securing the circuit board in the interior portion of the top cap portion.

In some implementations, the top cap portion can be coupled to the bottom cap portion using one or more cap slides (e.g., slides 4). The cap slides can be configured to couple the top cap portion to the bottom cap portion using at least one of: releasably coupling the top cap portion to the bottom cap portion and permanently coupling the top cap portion to the bottom cap portion. The top cap portion can include one or more return springs (e.g., springs 7) and the bottom cap portion can include one or more spring slots (e.g., slots 8) configured to mate with the one or more return springs upon coupling of the top cap portion and the bottom cap portion. The return springs and the spring slots can be configured to releasably couple the top and bottom cap portions.

In some implementations, the top cap portion can includes a switch (e.g., switch 9) and the circuit board can include a switch toggle feature (e.g., feature 10) configured to activate the switch to release the circuit board from the top cap portion.

In some implementations, the processor can be configured to cause at least one of the following: the display module to display at least one visual message, the audio module to generate at least one audio message, one or more visual indicators to generate one or more visual indications, and any combination thereof. At least one of the visual message, the audio message, and the visual indications can be generated based on at least one of the following: one or more stored messages by one or more memory communicatively coupled to the processor, the data received by the communication module, and any combination thereof. At least one of the visual message, the audio message, and the visual indications can include at least one of the following: a medication alert, a medication scheduling message, a medication management message, a message indicative of at least one of quantity and weight of one or more contents of the medication container, a medication refill message, a medication temperature message, and any combination thereof. Further, in some implementations, at least one of the visual message, the audio message, and the visual indications can include at least one of the following: a power supply message from the power supply module, a status of a communication from the communication module, a message indicating whether the medication container cap has been positioned on an incorrect medication container, and any combination thereof.

In some implementations, the message indicating whether the medication container cap has been positioned on an incorrect medication container can be generated using at least one radio-frequency identifying (RFID) label positioned on at least one of the medication container cap and the medication container. The RFID label can identify a first medication data associated with a medication placed in the medication container. The medication container cap can store one or more medication data. That medication data can be transmitted to the medication container cap. The message can indicating whether the medication container cap has been positioned on an incorrect medication container can be generated by detecting, using the communication module, the first medication data, comparing, using the processor, the first medication data to one or more stored medication data, generating, using the processor, the message indicating that the medication container cap has been positioned on an incorrect medication container upon failing to match the first medication data to one or more stored medication data, and generating, using the processor, the message indicating that the medication container cap has been positioned on a correct medication container upon matching the first medication data to the one or more stored medication data.

In some implementations, the display module can include at least one of the following: an LCD display, an OLED display, and any combination thereof. The audio module can include at least one of the following: a speaker, a vibration element, a piezoelectric element, a haptic-style vibration element, and any combination thereof. The one or more visual indicators can include one or more one or more light emitting diodes (LEDs).

In some implementations, the communication module can include at least one of the following: a wireless communication module, a cellular communication module, a Wi-Fi communication module, a Bluetooth™ communication module, a Bluetooth™ low energy communication module, a near-field communication module, and any combination thereof. The medication container cap, using the communication module, can be configured to communicatively couple to at least one of: another medication container cap, a computing device external to the medication container cap, a server external to the medication container cap, a wireless base station external to the medication container cap, and any combination thereof. Upon communicative coupling, the medication container cap can be configured to establish at least one of: an ad-hoc wireless communication network, a micro wireless communication network, a pico wireless communication network, and any combination thereof, with at least one of: another medication container cap, the computing device external to the medication container cap, the server external to the medication container cap, the wireless base station external to the medication container cap, and any combination thereof. Further, upon communicative coupling, the medication container cap can be configured to receive and/or transmit at least one message from and/or to at least one of: another medication container cap, the computing device external to the medication container cap, the server external to the medication container cap, the wireless base station external to the medication container cap, and any combination thereof.

In some implementations, the medication container cap can include one or more sensors (e.g., temperature sensor 655, accelerometer/magnetometer 620, sensors 2302, 2502, 2504, etc.). The sensors can include at least one of: a first sensor configured to detect positioning of the medication container cap on a medication container, a second sensor configured to detect contents of the medication container, and any combination thereof. The processor can be configured to generate at least one message based on one or more signals detected by one or more sensors.

Figure 31:
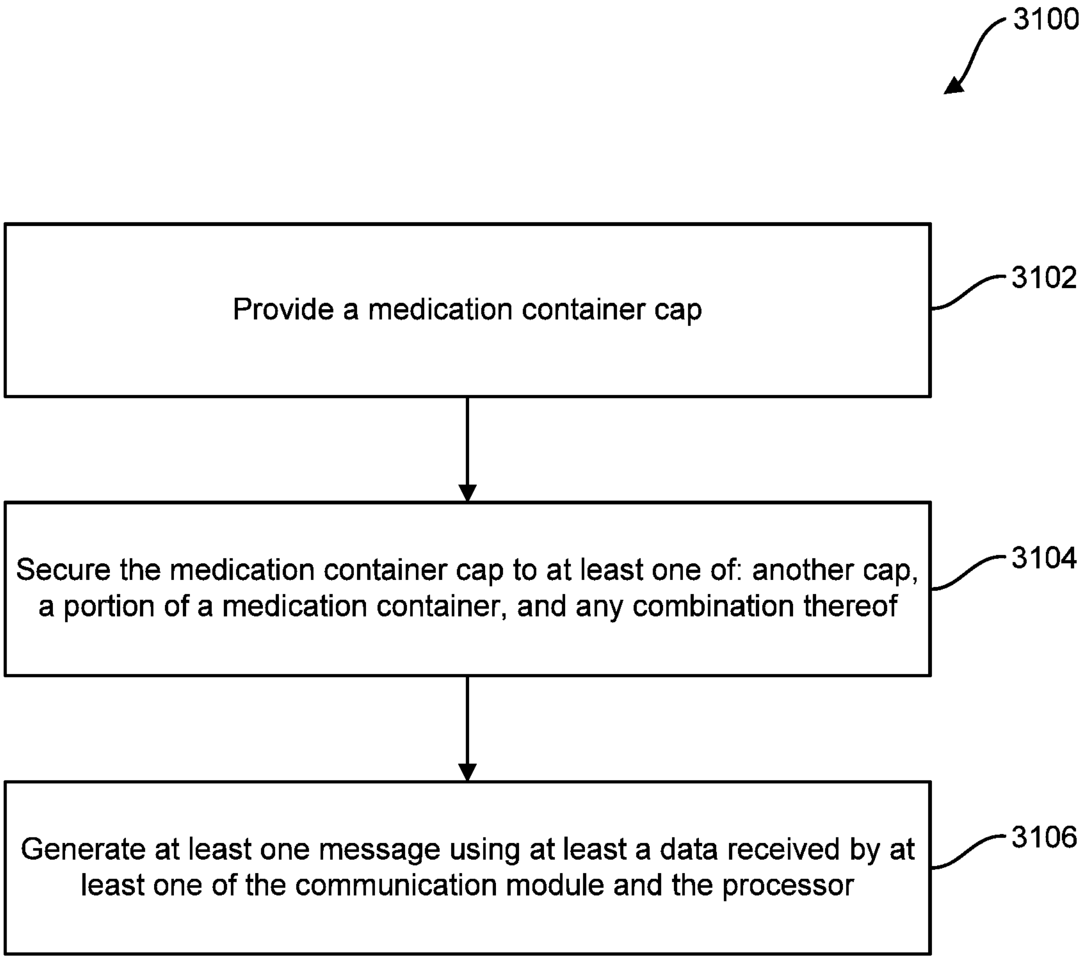
FIG. 31 illustrates another exemplary process, according to some implementations of the current subject matter.

FIG. 31 illustrates an exemplary method 3100 for medication management, according to some implementations of the current subject matter. The method 3100 can include providing a medication container cap (as described above), at 3102. The medication container cap can include a top cap portion (e.g., portion 1) configured to be coupled to a bottom cap portion (e.g., portion 15). The bottom cap portion can have an interior portion configured for insertion of at least one of: another cap (e.g., conventional cap 16), a portion of a medication container (e.g., a standard bottle), and any combination thereof. The top cap portion can be further configured to include at least one processor (e.g., microprocessor 605 shown in FIG. 6) and at least one communication module (e.g., elements 625, 630, 635 shown in FIG. 6). The processor can be configured to generate at least one message (e.g., medication alert, refill alert, power supply alert, communication alert, etc.) using at least a data received by at least one of: the communication module and the processor. The messages may be generated by the processor and displayed by a display (e.g., display 11), announced by a speaker (e.g., speaker 14), and/or visualized by one or more LEDs 18.

At 3104, the medication container cap can be secured to at least one of: another cap, a portion of a medication container, and any combination thereof. At 3106, at least one message can be generated using at least a data received by at least one of the communication module and the processor.

Each of the above identified modules or programs corresponds to a set of instructions for performing a function described above. These modules and programs (i.e., sets of instructions) need not be implemented as separate software programs, procedures or modules, and thus various subsets of these modules can be combined or otherwise re-arranged in various implementations. In some implementations, memory can store a subset of the modules and data structures identified above. Furthermore, memory can store additional modules and data structures not described above.

The illustrated aspects of the disclosure can also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the implementations of the subject innovation(s). Furthermore, it can be appreciated that many of the various components can be implemented on at least one integrated circuit (IC) chip. For example, in one implementation, a set of components can be implemented in a single IC chip. In other implementations, at least one of respective components are fabricated or implemented on separate IC chips.

What has been described above includes examples of the implementations of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated implementations of the subject disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that at least one component can be combined into a single component providing aggregate functionality or divided into several separate sub-components, and any at least one middle layer, such as a management layer, can be provided to communicatively couple to such sub-components in order to provide integrated functionality. Any components described herein can also interact with at least one other component not specifically described herein but known by those of skill in the art.

In addition, while a particular feature of the subject innovation can have been disclosed with respect to only one of several implementations, such feature can be combined with at least one other feature of the other implementations as can be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with at least one specific functionality. For example, a component can be, but is not limited to being, a process running on a processor (e.g., digital signal processor), a processor, an object, an executable, a thread of execution, a program, and/or a computer. By way of illustration, both an application running on a controller and the controller can be a component. At least one component can reside within a process and/or thread of execution and a component can be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by at least one local or remote computing device, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has at least one of its characteristics set or changed in such a manner as to encode information in at least one signal. By way of example, and not limitation, communication media include wired media, such as a wired network or direct-wired connection, and wireless media such as acoustic, radio frequency (RF), infrared and other wireless media.

In view of the exemplary systems described above, methodologies that can be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described herein. Furthermore, not all illustrated acts can be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least one exemplary implementation is described as using a plurality of units to perform the exemplary process, it is understood that the exemplary processes can also be performed by one or plurality of modules.

The use of the terms "first", "second", "third" and so on, herein, are provided to identify various structures, dimensions or operations, without describing any order, and the structures, dimensions or operations can be executed in a different order from the stated order unless a specific order is definitely specified in the context.

Approximating language, as used herein throughout the specification and claims, can be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language can correspond to the precision of an instrument for measuring the value. Here and throughout the specification and claims, range limitations can be combined and/or interchanged, such ranges are identified and include all the sub-ranges contained therein unless context or language indicates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A medication container cap, comprising:

memory;

a top cap portion configured to be coupled to a bottom cap portion, the bottom cap portion having an interior portion configured for insertion of at least one of: another cap, a portion of a medication container, and any combination thereof;

the top cap portion configured to include at least one processor and at least one communication module, the at least one processor is configured to:

compare a first medication data with a second medication data stored in the memory; and generate a message indicating whether the medication container cap has been positioned on an incorrect medication container responsive to the comparison of the first medication data with the second medication data.

2. The medication container cap according to claim 1, wherein the another cap includes a cap of a standard pill bottle.

3. The medication container cap according to claim 1, further comprising a circuit board configured to be positioned in an interior portion of the top cap portion, the circuit board is configured to include at least one of the following: the at least one processor, the at least one communication module, a display module, an audio module, one or more visual indicators, a power module, and any combination thereof.

4. The medication container cap according to claim 3, wherein the circuit board is configured to be secured in the interior portion of the top cap portion using one or more board snaps, the one or more board snaps are configured to secure the circuit board using at least one of: releasably securing the circuit board in the interior portion of the top cap portion and permanently securing the circuit board in the interior portion of the top cap portion.

5. The medication container cap according to claim 3, wherein the top cap portion is coupled to the bottom cap portion using one or more cap slides, the one or more cap slides are configured to couple the top cap portion to the bottom cap portion using at least one of: releasably coupling the top cap portion to the bottom cap portion and permanently coupling the top cap portion to the bottom cap portion.

6. The medication container cap according to claim 5, wherein the top cap portion includes one or more return springs and the bottom cap portion includes one or more spring slots configured to mate with the one or more return springs upon coupling of the top cap portion and the bottom cap portion, the one or more return springs and the one or more spring slots are configured to releasably couple the top cap portion and the bottom cap portion.

7. The medication container cap according to claim 3, wherein the top cap portion includes a switch and the circuit board includes a switch toggle feature configured to activate the switch to release the circuit board from the top cap portion.

8. The medication container cap according to claim 3, wherein the at least one processor is configured to cause at least one of the following:

the display module to display at least one visual message;

the audio module to generate at least one audio message;

the one or more visual indicators to generate one or more visual indications;

and any combination thereof.

9. The medication container cap according to claim 8, wherein at least one of the at least one visual message, the at least one audio message, and the one or more visual indications being generated based on at least one of the following: one or more stored messages by the memory communicatively coupled to the at least one processor, the data received by the at least one communication module, and any combination thereof.

10. The medication container cap according to claim 8, wherein at least one of the at least one visual message, the at least one audio message, and the one or more visual indications include at least one of the following: a medication alert, a medication scheduling message, a medication management message, a message indicative of at least one of quantity and weight of one or more contents of the medication container, a medication refill message, a medication temperature message, and any combination thereof.

11. The medication container cap according to claim 8, wherein at least one of the at least one visual message, the at least one audio message, and the one or more visual indications include at least one of the following: a power supply message from a power supply module, a status of a communication from the at least one communication module, a message indicating whether the medication container cap has been positioned on the incorrect medication container, and any combination thereof.

12. The medication container cap according to claim 11, wherein the message indicating whether the medication container cap has been positioned on the incorrect medication container is generated using at least one radio-frequency identifying label positioned on at least one of the medication container cap and the medication container, the at least one radio-frequency identifying label identifying the first medication data associated with a medication placed in the medication container.

13. The medication container cap according to claim 12, wherein the medication container cap storing one or more medication data that includes the second medication data, the one or more medication data being transmitted to the medication container cap.

14. The medication container cap according to claim 13, wherein the message indicating whether the medication container cap has been positioned on the incorrect medication container is generated by detecting, using the at least one communication module, the first medication data;

generating, using the at least one processor, the message indicating that the medication container cap has been positioned on the incorrect medication container upon failing to match the first medication data to at least the second medication data; and generating, using the at least one processor, the message indicating that the medication container cap has been positioned on a correct medication container upon matching the first medication data to at least the second medication data.

15. The medication container cap according to claim 3, wherein the display module includes at least one of the following: an LCD display, an OLED display, and any combination thereof;

the audio module includes at least one of the following: a speaker, a vibration element, a piezoelectric element, a haptic-style vibration element, and any combination thereof; and the one or more visual indicators include one or more one or more light emitting diodes (LEDs).

16. The medication container cap according to claim 3, wherein the at least one communication module includes at least one of the following: a wireless communication module, a cellular communication module, a Wi-Fi communication module, a Bluetooth™ communication module, a Bluetooth™ low energy communication module, a near-field communication module, and any combination thereof.

17. The medication container cap according to claim 16, wherein the medication container cap, using the at least one communication module, is configured to communicatively couple to at least one of: another medication container cap, a computing device external to the medication container cap, a server external to the medication container cap, a wireless base station external to the medication container cap, and any combination thereof.

18. The medication container cap according to claim 17, wherein, upon communicative coupling, the medication container cap is configured to establish at least one of: an ad-hoc wireless communication network, a micro wireless communication network, a pi co wireless communication network, and any combination thereof, with at least one of: another medication container cap, the computing device external to the medication container cap, the server external to the medication container cap, the wireless base station external to the medication container cap, and any combination thereof.

19. The medication container cap according to claim 18, wherein, upon communicative coupling, the medication container cap is configured to receive and/or transmit at least one message from and/or to at least one of: another medication container cap, the computing device external to the medication container cap, the server external to the medication container cap, the wireless base station external to the medication container cap, and any combination thereof.

20. The medication container cap according to claim 3, further comprising one or more sensors, the one or more sensors including at least one of: a first sensor configured to detect positioning of the medication container cap on the medication container, a second sensor configured to detect contents of the medication container, and any combination thereof;

the at least one processor being configured to generate at least one message based on one or more signals detected by the one or more sensors.

21. A method for executing medication management, comprising:

providing a medication container cap, the medication container cap including a top cap portion configured to be coupled to a bottom cap portion, the bottom cap portion having an interior portion configured for insertion of at least one of: another cap, a portion of a medication container, and any combination thereof;

the top cap portion configured to include at least one processor and at least one communication module, the at least one processor is configured to:

compare a first medication data with a second medication data stored in memory of the medication container cap; and generate a message indicating whether the medication container cap has been positioned on a correct medication container responsive to the comparison of the first medication data with the second medication data.

* * * * *